US009769602B2

United States Patent
Tong et al.

(10) Patent No.: US 9,769,602 B2
(45) Date of Patent: Sep. 19, 2017

(54) MULTI-USER CONTENT DISTRIBUTION

(71) Applicant: Accenture Global Services Limited, Dublin (IE)

(72) Inventors: Alwin Tong, Sunnyside, NY (US); Roman Kalantari, Brooklyn, NY (US)

(73) Assignee: Accenture Global Services Limited, Dublin (IE)

( * ) Notice: Subject to any disclaimer, the term of this patent is extended or adjusted under 35 U.S.C. 154(b) by 74 days.

(21) Appl. No.: 14/816,618

(22) Filed: Aug. 3, 2015

(65) Prior Publication Data
US 2016/0212578 A1    Jul. 21, 2016

Related U.S. Application Data

(60) Provisional application No. 62/103,590, filed on Jan. 15, 2015.

(51) Int. Cl.
*H04W 24/00*  (2009.01)
*H04W 4/02*  (2009.01)
*H04W 76/02*  (2009.01)

(52) U.S. Cl.
CPC .......... *H04W 4/02* (2013.01); *H04W 76/023* (2013.01)

(58) Field of Classification Search
CPC ...................................... H04W 4/02
USPC ........................ 455/456.1; 709/204
See application file for complete search history.

(56) References Cited

U.S. PATENT DOCUMENTS

| 7,812,860 B2 | 10/2010 | King et al. |
| 2010/0057887 A1* | 3/2010 | Wang .................... G06Q 10/087 709/219 |
| 2010/0287052 A1* | 11/2010 | Minter ................... G06Q 30/02 705/14.64 |
| 2013/0178163 A1* | 7/2013 | Wang ..................... H04W 4/008 455/41.2 |
| 2013/0297422 A1 | 11/2013 | Hunter et al. |

(Continued)

FOREIGN PATENT DOCUMENTS

CN    102903313    4/2015

OTHER PUBLICATIONS

Ho, "Gesture-based Image Acquisition between Smartphone and Digital Signage," University of Waterloo, 2011, 59 pages.
(Continued)

*Primary Examiner* — Charles Shedrick
(74) *Attorney, Agent, or Firm* — Harrity & Harrity, LLP

(57) ABSTRACT

According to some possible implementations, a device may obtain information related to multi-user content. The multi-user content may facilitate an interaction between users of different user devices. The device may store the multi-user content in local storage. The device may receive a request to establish connections with two or more user devices. The request may include connection information that is available from a display that is located at a location. The device, and the two or more user devices, may be located at the location. The location may include an area with no Internet connectivity or limited Internet connectivity. The device may establish the connections with the two or more user devices based on the connection information and via a local area network. The device may provide the multi-user content to the two or more user devices via the connections.

20 Claims, 18 Drawing Sheets

(56) References Cited

U.S. PATENT DOCUMENTS

| | | | |
|---|---|---|---|
| 2014/0003286 A1* | 1/2014 | Estevez | H04W 84/18 370/254 |
| 2014/0244747 A1* | 8/2014 | Aggarwal | H04L 67/22 709/204 |
| 2014/0306994 A1 | 10/2014 | Brown et al. | |
| 2015/0186941 A1* | 7/2015 | Anthony | G06Q 30/0242 705/14.41 |

OTHER PUBLICATIONS

Kim et al., "Thumbnail Selection: Delivering Digital Signage Contents to Mobile Phone," 15th International Conference on Advanced Communication Technology, Jan. 2013, 5 pages.

Interactive Digital Signage Solutions by LINKETT, "Smart Interactive Digital Signage," http://linkett.com/marketing-technology/interactive-digital-signage/, Feb. 18, 2015, 7 pages.

She et al., "Smart Signage: A Draggable Cyber-physical Broadcast/Multicast Media System," IEEE Transactions on Emerging Topics in Computing, Issue No. 2, Dec. 2013, 9 pages.

Russell, "11 Amazing Augmented Reality Ads," Business Insider, Jan. 28, 2012, 2 pages.

Hall, "Bridging the Online and Offline Retail Worlds: Net-a-Porter Launches Karl at the Window Shops," http://theemergingdesigner.com/bridging-the-online-and-offline-retail-worlds-net-a-porter-launches-karl-at-the-window-shops/, Jan. 27, 2012, 4 pages.

Wasserman, "Tic Tac Launches Augmented Reality-Enabled Times Square Billboards", http://mashable.com/2012/02/14/tic-tac-augmented-reality-times-square-billboards/, Mashable, Feb. 14, 2012, 9 pages.

Wasserman, "Starbucks Makes Valentine's Day an Augmented Reality", http://mashable.com/2012/02/07/starbucks-valentines-day-augmented-reality/, Mashable, Feb. 7, 2012, 7 pages.

\* cited by examiner

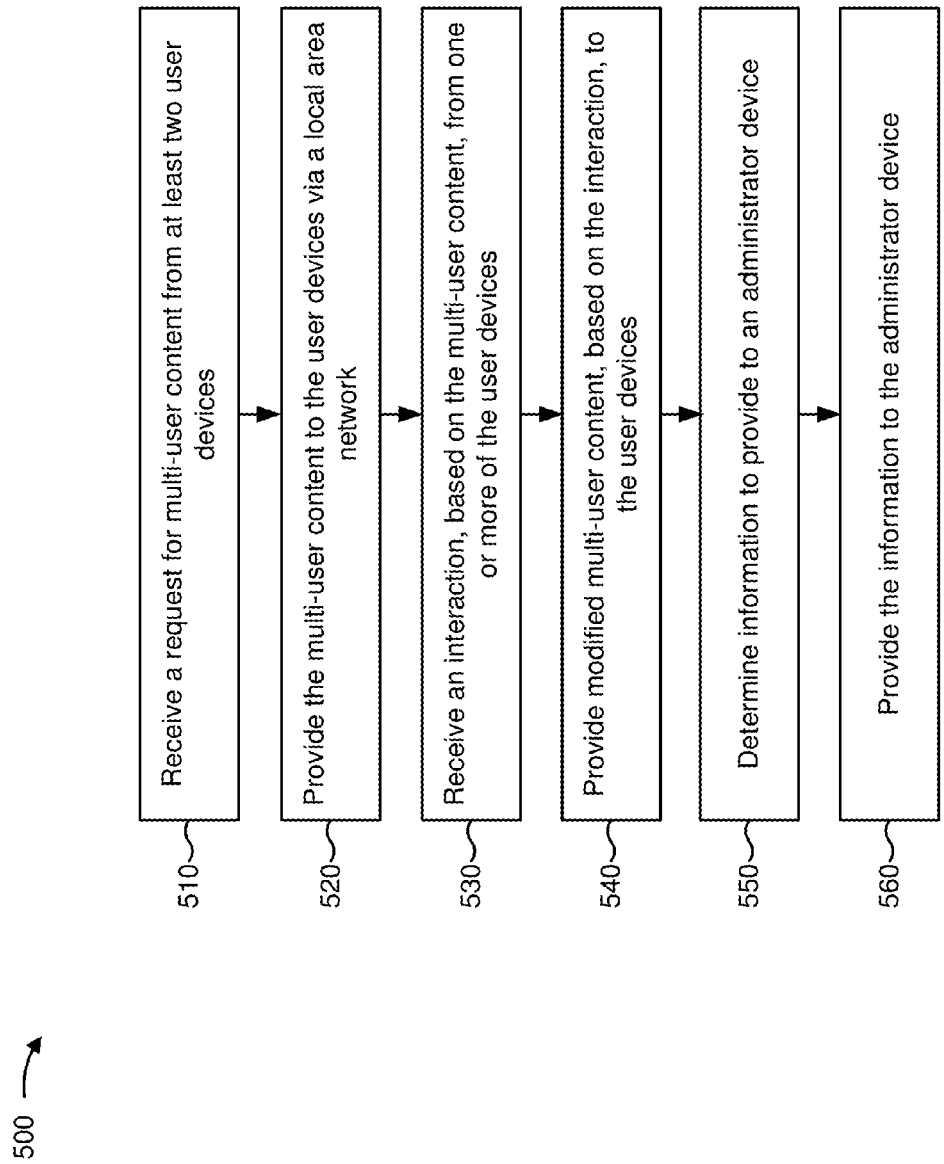

MULTI-USER CONTENT DISTRIBUTION

RELATED APPLICATION

This application claims priority under 35 U.S.C. §119 to U.S. Provisional Patent Application No. 62/103,590, filed on Jan. 15, 2015, the content of which is incorporated by reference herein in its entirety.

BACKGROUND

A user device may receive information from and/or provide information to another device via a connection to a network, such as a cellular network, a local area network, or the like. Certain networks may be unavailable in certain situations. For example, a cellular network may be unavailable in an underground tunnel, a remote location, an airplane, or the like.

SUMMARY

According to some possible implementations, a device may include one or more processors. The one or more processors may obtain information related to multi-user content. The multi-user content may facilitate an interaction between users of different user devices. The one or more processors may store the multi-user content in local storage. The one or more processors may receive a request to establish connections with two or more user devices. The request may include connection information that is available from a display that is located at a location. The device, and the two or more user devices, may be located at the location. The location may include an area with no Internet connectivity or limited Internet connectivity. The one or more processors may establish the connections with the two or more user devices based on the connection information and via a local area network. The one or more processors may provide the multi-user content to the two or more user devices via the connections.

According to some possible implementations, a computer-readable medium may store one or more instructions. The one or more instructions, when executed by one or more processors of a device, may cause the one or more processors to obtain multi-user content that may facilitate an interaction between users of different user devices. The one or more instructions, when executed by the one or more processors, may cause the one or more processors to store the multi-user content in local storage. The one or more instructions, when executed by the one or more processors, may cause the one or more processors to receive a request to establish a connection with one or more user devices. The request may include connection information that is available from a display that is located at a location. The device, and the one or more user devices, may be located at the location, and the location may be associated with no Internet connectivity or limited Internet connectivity. The one or more instructions, when executed by the one or more processors, may cause the one or more processors to establish the connection with the one or more user devices based on the connection information and via a local area network. The one or more instructions, when executed by the one or more processors, may cause the one or more processors to provide the multi-user content to the one or more user devices via the connections.

According to some possible implementations, a method may include receiving, by a device, multi-user content. The multi-user content may facilitate an interaction between users of different user devices. The method may include storing, in local storage, the multi-user content. The method may include receiving a request to establish connections with two or more user devices. The request may include connection information that is obtained from a display that is located at a location. The device, and the two or more user devices, may be located at the location, and the connection information may be associated with the multi-user content. The location may be associated with no Internet connectivity or limited Internet connectivity. The method may include establishing the connections with the two or more user devices based on the connection information and via a local area network. The method may include providing, by the device, the multi-user content to the two or more user devices via the connections.

BRIEF DESCRIPTION OF THE DRAWINGS

FIG. 5 is a flow chart of an example process for providing multi-user content to user devices;

DETAILED DESCRIPTION

The following detailed description of example implementations refers to the accompanying drawings. The same reference numbers in different drawings may identify the same or similar elements.

A user device may communicate with other devices via a variety of networks, such as local area networks, cellular networks, or the like. Certain networks may permit the user device to access the Internet. For example, when the user device accesses a local area network that is connected to the Internet, the cellular network, or the like, the user device may be able to interact with other devices that are connected to the Internet. However, in some situations, the user device may be isolated from the Internet. For example, the user may not have access to the cellular network, may receive cellular network coverage that is inadequate to permit the user device to access the Internet, may be isolated from a network that connects to the Internet, or the like.

Implementations described herein may permit a content server device to provide multi-user content to a set of user devices that are isolated from the Internet. An access point associated with the content server device may provide a local area network, via which the content server device may provide the multi-user content to the set of user devices. When the set of user devices are isolated from the Internet, the set of user devices may be more likely to interact more deeply with the multi-user content than when the set of user devices are not isolated from the Internet. Further, the content server device may provide the multi-user content to the set of user devices at a higher bandwidth than the set of user devices may achieve via a cellular network, which may prevent delay in content consumption due to buffering of the multi-user content. In this way, the content server device may determine information related to device interactions with the multi-user content (e.g., advertising information, user information, etc.), and may determine more information than when the set of user devices can access the Internet.

Certain implementations are described herein as providing multi-user content to two or more user devices. In some implementations, a content server device may provide content to one user device. For example, a single user device may provide connection information, and a content server device may provide multi-user content to the single user device.

Figure 1A:
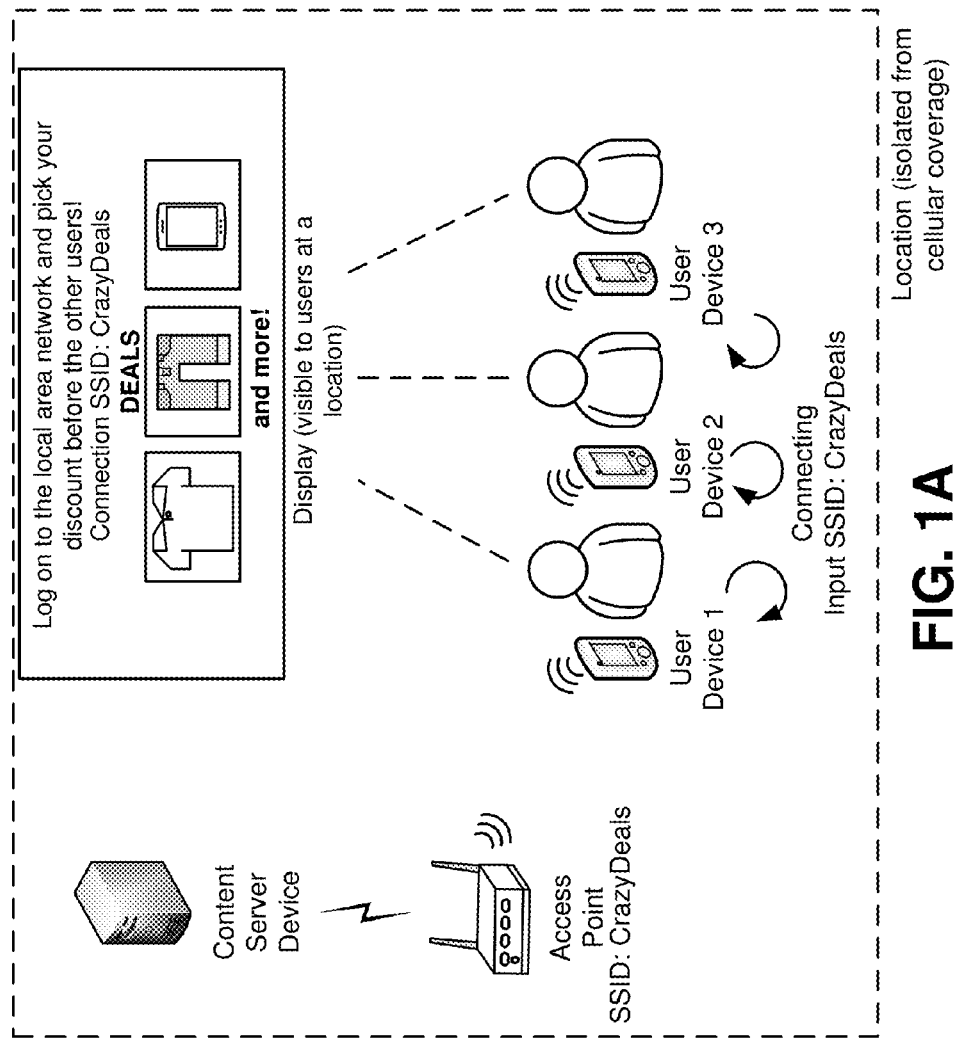
FIGS. 1A and 1B are diagrams of an overview of an example implementation described herein.
Figure 1B:
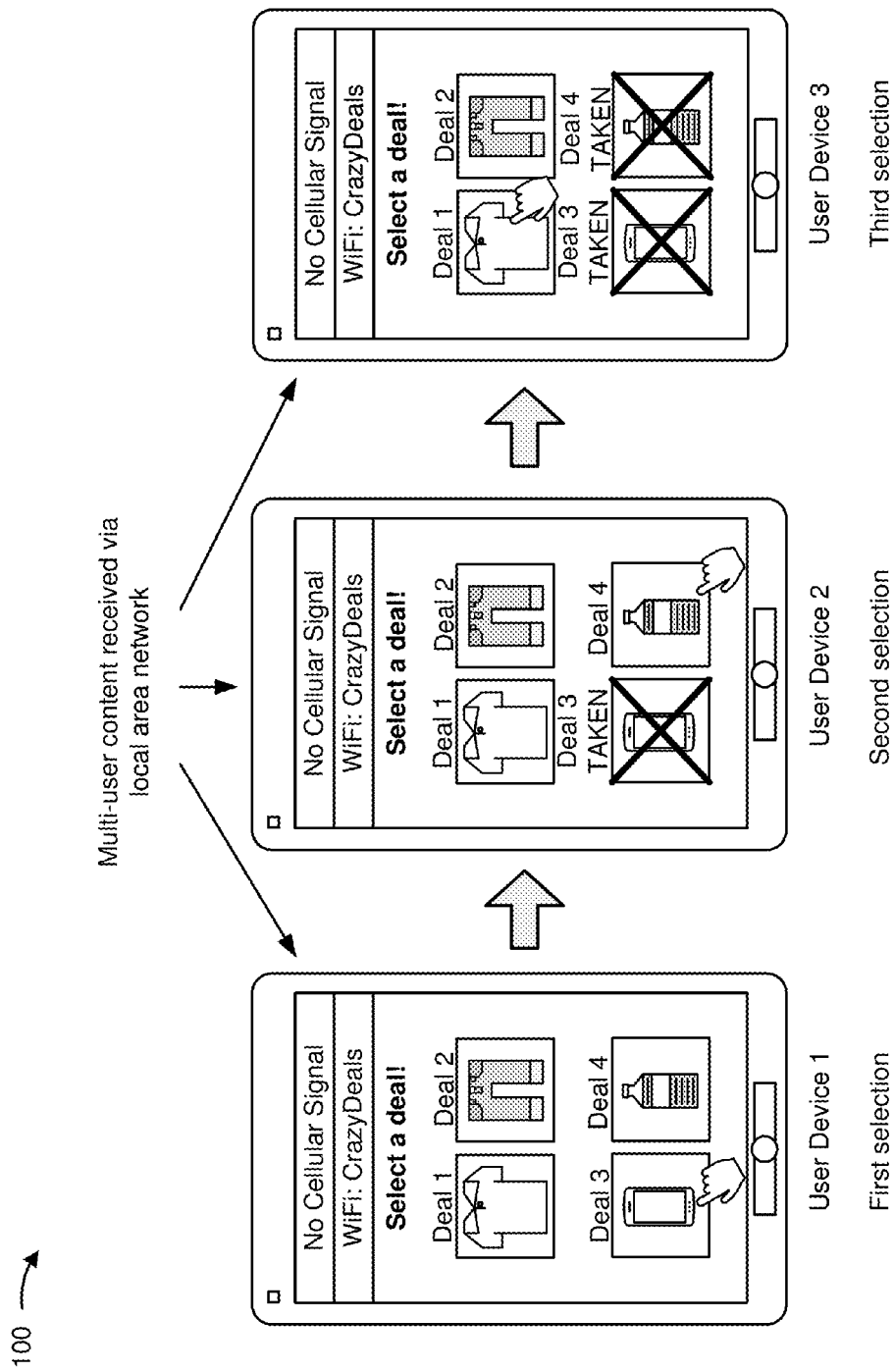

FIGS. 1A and 1B are diagrams of an overview of an example implementation 100 described herein. As shown in FIG. 1A, a content server device, an access point, and a display may be located at a location. As further shown, the location may be isolated from cellular coverage. Assume that the access point provides a local area network in the location, with which user devices 1-3 may connect. As shown, the display may be visible to users of user devices 1-3. As further shown, the display may provide information related to multi-user content. Here, the display provides connection information for connecting to the local area network to access the multi-user content (e.g., a service set identifier (SSID) of "CrazyDeals"). Further, the display provides information related to the multi-user content (e.g., information advertising deals to be selected by users of user devices 1-3). As shown, user devices 1-3 connect to the local area network based on the SSID.

As shown in FIG. 1B, the multi-user content that is provided to user devices 1-3 may identify four deals to be selected by user devices 1-3. As shown, user device 1 selects a deal (e.g., Deal 3). Assume that user device 1 transmits information to the content server device based on user device 1 selecting Deal 3, and assume that the content server device transmits information to user devices 2 and 3 indicating that Deal 3 is taken. As shown, user device 2 selects Deal 4, from the remaining available deals of Deal 1, Deal 2, and Deal 4. As further shown, user device 3 selects Deal 1, from the remaining deals of Deal 1 and Deal 2 (e.g., based on user device 2 having previously selected Deal 4).

In this way, the content server device may provide multi-user content to user devices that are isolated from cellular coverage, which may permit the user devices to interact more extensively with the multi-user content than if the user devices were not isolated from cellular coverage. Further, by providing the multi-user content over the local area network, the content server device may conserve cellular data of the user devices, may provide content that requires greater bandwidth than content that can be provided via the cellular network, and may provide content at a greater bandwidth than a bandwidth at which the content server device obtained the content.

Figure 2:
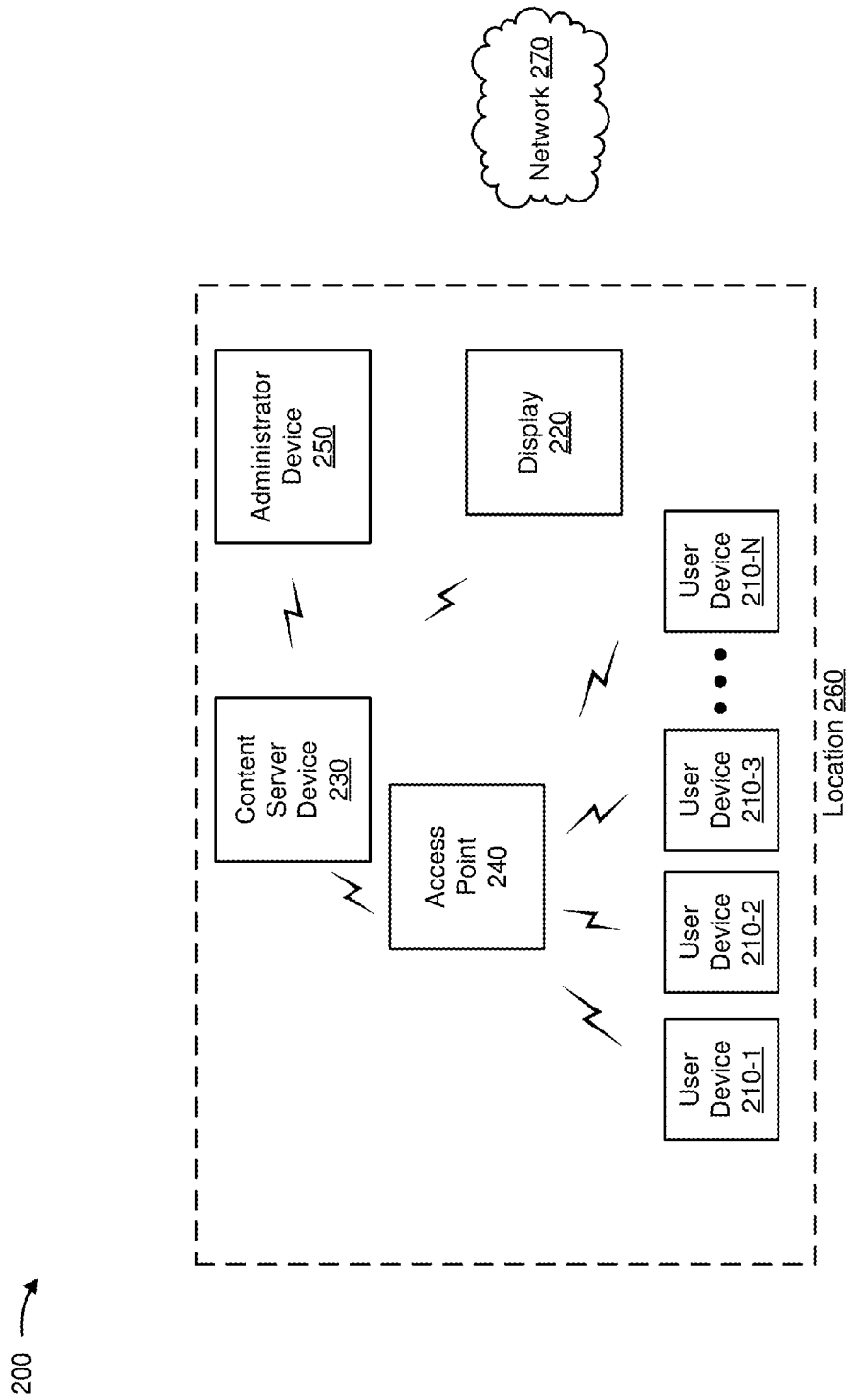
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N (N≥1) (hereinafter referred to collectively as "user devices 210," and individually as "user device 210"), a display 220, a content server device 230, an access point 240, an administrator device 250, and a network 270. One or more devices of environment 200 may be located at a location 260.

Devices of environment 200 may interconnect via wired connections, wireless connections, or a combination of wired and wireless connections.

User device 210 may include a device capable of receiving, generating, storing, processing, and/or providing information. For example, user device 210 may include a device, such as a mobile phone (e.g., a smart phone, a radiotelephone, etc.), a laptop computer, a tablet computer, a desktop computer, a handheld computer, a gaming device, or a similar device. In some implementations, user device 210 may receive information from and/or transmit information to another device in environment 200. User device 210 may include an interface that may provide information (e.g., multi-user content) to and/or receive user inputs from a user of user device 210.

Display 220 may include a device capable of providing information to a user and/or user device 210. For example, display 220 may include a printed billboard, a sign, a flyer, a projector, a television screen, a computer screen, a surface (e.g., that displays information), an audio speaker, a Quick Response (QR) code, a bar code, a radio frequency identification (RFID) chip, or any other device capable of providing information to a user and/or user device 210. Display 220 may provide connection information for connecting to a local area network associated with content server device 230.

Content server device 230 may include one or more devices capable of receiving, generating, storing, processing, and/or providing information related to multi-user content. For example, content server device 230 may include a server or a similar device. In some implementations, content server device 230 may be affixed to a movable platform, such as an automobile, a train car, an airplane, an unmanned aerial vehicle (UAV), or the like. Content server device 230 may be located at location 260.

Access point 240 may include one or more devices capable of providing a local area network. For example, access point 240 may include a router, a modem, and/or another type of device that allows user device 210 to communicate, via local area network, with one or more other user devices 210 and/or with one or more devices located at location 260 (e.g., content server device 230, administrator device 250, etc.). In some implementations, access point 240 may be included in content server device 230 and/or may be a component of content server device 230. In some implementations, access point 240 may be affixed to a movable platform, such as an automobile, a train car, an airplane, an unmanned aerial vehicle (UAV), or the like. Access point 240 may be located at location 260. In some implementations, access point 240 may be configured to implement a wireless communication standard, such as an IEEE 802.11 standard, a Bluetooth standard, or the like.

Administrator device 250 may include one or more devices capable of receiving, generating, storing, processing, and/or providing information related to multi-user content. For example, administrator device may include a mobile phone (e.g., a smart phone, etc.), a laptop computer, a tablet computer, a desktop computer, a handheld computer, a server, a group of servers, or the like. Administrator device 250 may be capable of connecting with content server device 230 via a local area network provided by access point 240. In some implementations, administrator device 250 may include an application programming interface to communicate with one or more other devices of environment 200 (e.g., user device 210, content server device 230, etc.).

Location 260 may include a location at which access point 240 provides a local area network. Content server device 230 and/or access point 240 may be located at location 260. For example, location 260 may include a retail store, a tunnel, a subway station, a concert venue, an automobile, a house, a room, an office building, a train car, a bus, a passenger area of a boat, an airplane, or another type of location. In some implementations, location 260 may be coextensive with a local area network provided by access point 240. Location 260 may be associated with no Internet connection or limited Internet connection (e.g., based on having no cellular coverage or limited cellular coverage, based on not being connected with a network that connects to the Internet, etc.).

Network 270 may include one or more wired and/or wireless networks. For example, network 270 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
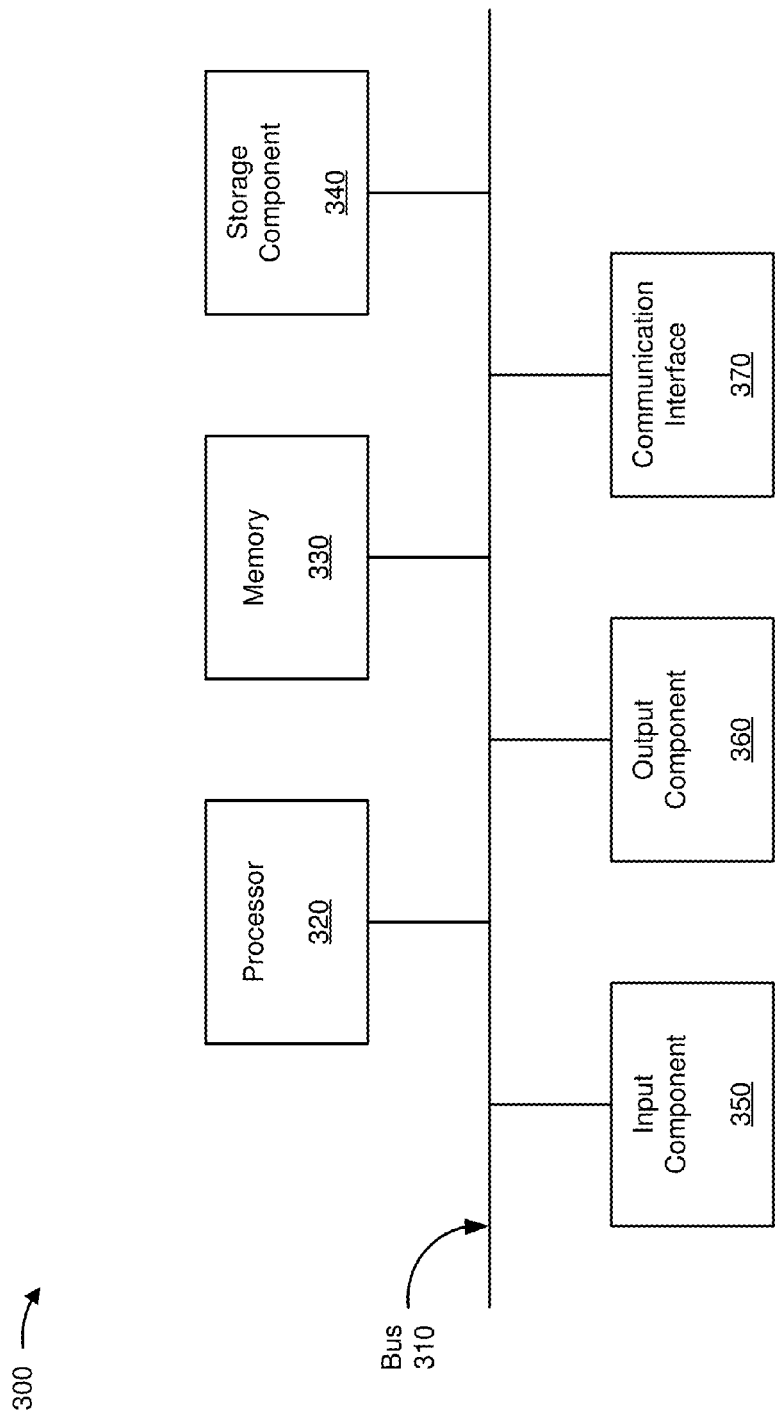
FIG. 3 is a diagram of example components of one or more devices of FIG. 2.

FIG. 3 is a diagram of example components of a device 300. Device 300 may correspond to user device 210, display 220, content server device 230, access point 240, and/or administrator device 250. In some implementations, user device 210, display 220, content server device 230, access point 240, and/or administrator device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
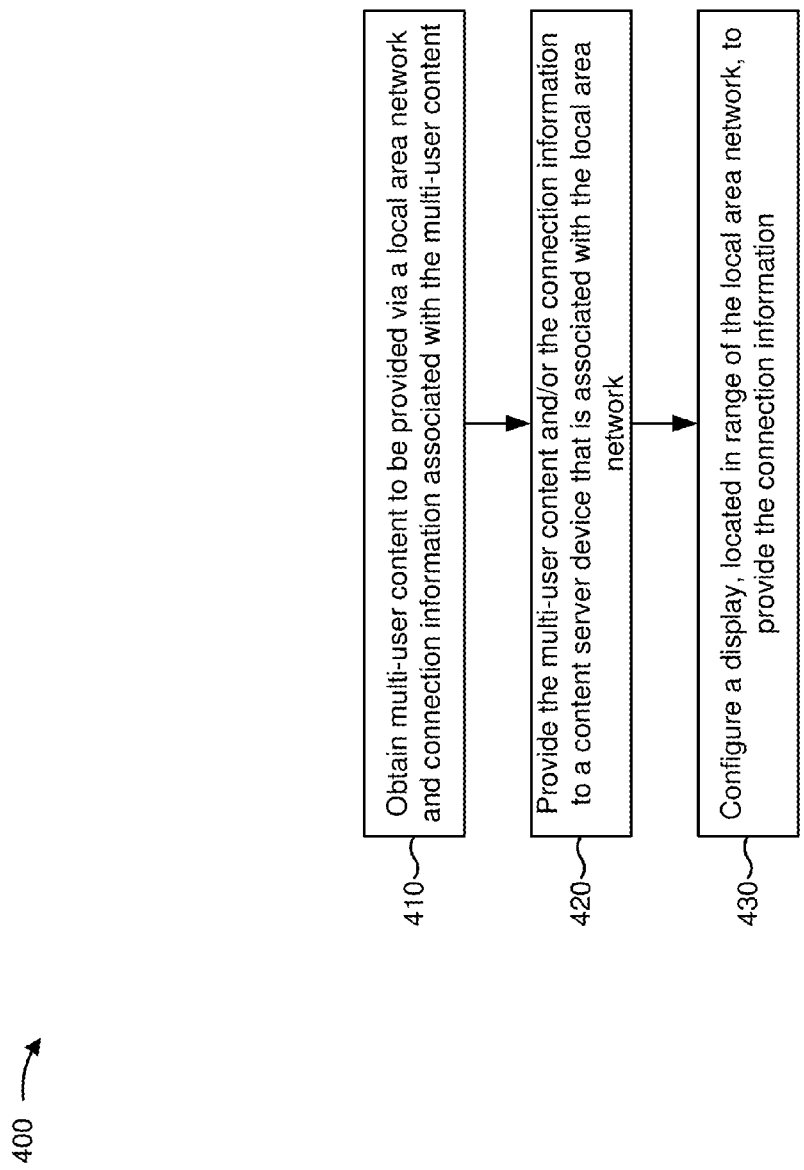
FIG. 4 is a flow chart of an example process for configuring a content server device and a display to provide multi-user content.

FIG. 4 is a flow chart of an example process 400 for configuring a content server device and a display to provide multi-user content. In some implementations, one or more process blocks of FIG. 4 may be performed by administrator device 250. In some implementations, one or more process blocks of FIG. 4 may be performed by another device or a group of devices separate from or including administrator device 250, such as user device 210, display 220, content server device 230, and/or access point 240.

As shown in FIG. 4, process 400 may include obtaining multi-user content to be provided via a local area network and connection information associated with the multi-user content (block 410). For example, administrator device 250 may obtain multi-user content to be provided via a local area network. The local area network may be provided by access point 240. User device 210 may receive the multi-user content and/or information related to the multi-user content from content server device 230 via the local area network. Administrator device 250 may obtain the multi-user content from a content provider, such as an advertiser, a game producer, a studio, an artist, or the like.

In some implementations, the multi-user content may include content that may be provided to one or more user devices 210. Additionally, or alternatively, the multi-user content may include content that permits user devices 210 to interact with elements of the content or with each other. For example, the multi-user content may include a single-player game (e.g., Solitaire, FreeCell, etc.), and/or may include a multi-player game in which two or more players may interact with each other and/or with an environment of the multi-player game (e.g., a competitive game, a trivia game, a fantasy football league, a collaborative game in a large venue, etc.). As another example, the multi-user content may include an application that permits users to interact with other users based on user profiles, user device types, locations of the users, information inputted by the users, or the like. As yet another example, the multi-user content may include visual and/or textual information, audible information, textual information, images, videos, digital newspaper, a magazine, a film, an audiobook, a catalog, to be provided to one user device 210 or a set of user devices 210, or the like.

As another example, the multi-user content may include advertising content. For example, a retail store may provide a set of discounts on particular products, and user devices 210 may claim the discounts in a particular order (e.g., a first-come-first-served order, an order based on locations of the user devices 210, an order based on an outcome of a multi-player game including the user devices 210, etc.). After a first user device 210 claims a particular discount, the particular discount may be unavailable to other user devices 210. As another example, the multi-user content may include a form to complete (e.g., a registration form for a newsletter, a job application, a credit application, a loan application, a form to become eligible for a discount, a user information form, a shopping list, etc.).

As yet another example, the multi-user content may include media to be presented to two or more user devices 210 and a comment section, in which users of the two or more user devices 210 may comment. The above examples of multi-user content are not intended to be exhaustive, and other types of multi-user content may be implemented.

In some implementations, administrator device 250 may obtain connection information for accessing the multi-user content. User device 210 may access the multi-user content based on the connection information. For example, access point 240 may provide a local area network, such as a WiFi network, a Bluetooth network, a short-range cellular data network (e.g., that may be coextensive with location 260), or the like. Access point 240 may require login information to connect with the local area network, such as a service set identifier (SSID), a password, a device identifier, a type of user device 210, a user interaction with an advertisement provided via user device 210, or the like. In such cases, the connection information may include the login information.

Additionally, or alternatively, the connection information may include information that is associated with the multi-user content. For example, the connection information may include an SSID, a text string, or the like, that corresponds to particular multi-user content. Administrator device 250 may obtain connection information that is associated with (e.g., corresponds to) particular multi-user content, and may provide the connection information and the particular multi-user content to content server device 230. Content server device 230 may store and associate the connection information and the particular multi-user content.

As further shown in FIG. 4, process 400 may include providing the multi-user content and/or the connection information to a content server device that is associated with the local area network (block 420). For example, administrator device 250 may provide the multi-user content and/or the connection information to content server device 230. In some implementations, administrator device 250 may provide the multi-user content via access point 240. In some implementations, administrator device 250 may be associated with administrator account credentials that permit administrator device 250 to configure display 220, content server device 230, and/or access point 240. Additionally, or alternatively, administrator device 250 may provide the connection information to content server device 230 via another type of connection (e.g., a wired connection, a combination of wired connections and wireless connections, etc.). In some implementations, content server device 230 may store the multi-user content and/or the connection information in local storage.

In some implementations, administrator device 250 may provide the multi-user content and/or the connection information to content server device 230 via one or more user devices 210. For example, administrator device 250 may provide the multi-user content and/or the connection information to user device 210 based on user device 210 possibly connecting with content server device 230 via a local area network at a later time, or coming within range of the local area network at a later time. In this way, administrator device 250 may provide the multi-user content and/or the connection information to content server device 230 via user device 210, which may permit administrator device 250 to provide multi-user content without being located at location 260.

In some implementations, administrator device 250 may provide the multi-user content and/or the connection information to multiple user devices 210, which may improve a probability of successfully providing the multi-user content and/or the connection information to content server device 230. In some implementations, administrator device 250 may divide the multi-user content and/or the connection information into multiple subsets, and may provide each of the multiple subsets to one or more user devices 210. Content server device 230 may connect with one or more of the user devices 210 and may reassemble the multi-user content and/or the connection information from the multiple subsets. In this way, administrator device 250 may provide multi-user content and/or connection information via multiple user devices 210, which may improve a probability of successfully providing the multi-user content and/or connection information to content server device 230.

As further shown in FIG. 4, process 400 may include configuring a display, located in range of the local area network, to provide the connection information (block 430). For example, administrator device 250 may configure display 220. Display 220 may be located in range of the local area network at location 260. Display 220 may provide the connection information and/or other information related to the multi-user content. In some implementations, another device (e.g., content server device 230) may configure display 220.

In some implementations, administrator device 250 may configure display 220. For example, display 220 may include a television screen, a computer screen, or the like, and administrator device 250 may cause display 220 to visually display the connection information and/or to visually display media related to the multi-user content (e.g., by providing a signal to display 220, by programming display 220 to display the information, etc.). In some implementations, administrator device 250 may cause display 220 to provide the connection information via a connection with user device 210. For example, display 220 may include an RFID chip, a Bluetooth component, or the like, and administrator device 250 may configure display 220 to communicate the connection information to user device 210.

In some implementations, another entity may configure display 220. For example, display 220 may include a sign, a printed display, or the like, and a person may affix the connection information to display 220, may modify display 220 to visually display the connection information, or the like.

In some implementations, display 220 may provide information in association with the connection information. For example, display 220 may identify the multi-user content, may provide advertisements in association with the multi-user content, may display the multi-user content before, while, and/or after user devices 210 interact with the multi-user content, or the like. In this way, administrator device 250, or another entity, may configure display 220 and/or content server device 230 to provide multi-user content based on connection information, which may cause users to interact with the multi-user content and, thus, provide information related to the users and/or the multi-user content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for providing multi-user content to user devices. In some implementations, one or more process blocks of FIG. 5 may be performed by content server device 230. In some implementations, one or more process blocks of FIG. 5 may be performed by another device or a group of devices separate from or including content server device 230, such as user device 210, display 220, access point 240, and/or administrator device 250.

As shown in FIG. 5, process 500 may include receiving a request for multi-user content from at least two user devices (block 510). For example, content server device 230 may receive a request for multi-user content from at least two user devices 210 via a local area network. In some implementations, user devices 210 and/or users of the user devices 210 may obtain connection information for the local area network from display 220. User devices 210, display 220 and/or content server device 230 may be located at location 260, in range of a local area network provided by access point 240 and in an area with no or limited cellular coverage. User devices 210 may connect to the local area network via access point 240 and using the connection information. For example, user device 210 may connect to the local area network by providing an SSID that is identified by the connection information, to access point 240.

In some implementations, content server device 230 may provide the multi-user content in a situation where user devices 210 have no Internet access, no cellular coverage, and/or limited cellular coverage. For example, location 260 may be located in an underground tunnel, in a train station, at an event in a secluded location, in a situation where a cellular network is overloaded (e.g., at a crowded football game, etc.), or the like. In such a situation, user devices 210 may be hindered from accessing content other than the multi-user content. Therefore, users of user devices 210 may be more amenable to interacting with the multi-user content, as compared to a situation where the users may access content other than the multi-user content. Further, content server device 230 may conserve data allowances of user devices 210 by providing the multi-user content via the local area network.

In some implementations, user device 210 may obtain the connection information based on a user input. For example, a user may view the connection information on display 220 and may input the connection information to user device 210. Additionally, or alternatively, user device 210 may obtain the connection information from a device associated with display 220. For example, user device 210 may receive the connection information from an RFID chip, via a WiFi connection with display 220, via a push notification from display 220 or content server device 230, or the like. Additionally, or alternatively, user device 210 may determine the connection information based on display 220. For example, display 220 may display scannable connection information (e.g., a QX code, a barcode, etc.), and user device 210 may scan the scannable connection information.

In some implementations, the request may include payment information. For example, user device 210 may provide information identifying a user account and a balance of credits for accessing multi-user content, may provide credit card information for accessing the multi-user content, or the like. In some implementations, content server device 230 may verify the payment information. For example, content server device 230 may verify based on a locally stored checksum algorithm, may verify a user account based on locally stored information, or the like. Content server device 230 may provide information identifying user device 210 and/or the payment information to administrator device 250, to verify payment information provided by user device 210, to record a purchase by user device 210, or for another reason, as described in more detail below.

In some implementations, location 260 may include multiple content server devices 230, access points 240, and/or local area networks. For example, a particular local area network, of location 260, may be provided by multiple access points 240, including one or more WiFi range extenders, one or more WiFi relays, one or more wireless routers, or the like, which may increase coverage of the local area network. In such implementations, the particular local area network may be accessed based on particular connection information, which may permit user device 210 to access multi-user content via the multiple access points 240. In some implementations, the particular local area network may include multiple content server devices 230, which may communicate with each other based on a wired connection, a wireless connection, via one or more user devices 210, or based on another type of connection.

In some implementations, one or more content server devices 230 may receive requests from different user devices 210 via different local area network connections. For example, display 220 may provide first connection information and second connection information. The first connection information and the second connection information may be associated with the same multi-user content, or may be associated with different multi-user content. For example, the first connection information may be associated with first multi-user content provided by a first content server device 230 via a first local area network, and the second connection information may be associated with second multi-user content provided by a second content server device 230 via a second local area network.

In some implementations, different types of user device 210 may be associated with different connection information. For example, a first user device 210, associated with a first operating system, may use first connection information, and a second user device 210, associated with a second operating system, may use second connection information. In this way, content server device 230 may provide multi-user content based on different connection information, which may improve versatility of content server device 230.

In some implementations, the request for multi-user content may include information related to user device 210. For example, content server device 230 may provide multi-user content to user device 210 based on user device 210 providing information to content server device 230 (e.g., information describing user device 210, describing a user of user device 210, etc.). In some implementations, content server device 230 may provide a user information form to user devices 210, and may provide access to multi-user content (e.g., a store discount, a multi-player game, etc.) based on a threshold quantity of the user devices 210 providing user information based on the user information form.

As further shown in FIG. 5, process 500 may include providing the multi-user content to the user devices via a local area network (block 520). For example, content server device 230 may provide the multi-user content to user devices 210 via the local area network. In some implementations, content server device 230 may host the multi-user content, and may provide an interface for interacting with the multi-user content to the user devices 210. For example, content server device 230 may host a multi-player game, and user devices 210 may interact with an environment of the multi-player game via interfaces of the user devices 210. As another example, content server device 230 may provide an advertisement, such as textual or video information regarding a product or service, a movie trailer, a playable game demonstration, a preview of a song, or the like.

As yet another example, content server device 230 may host a discussion forum and may provide media, such as a video file, an audio file, or the like, to the user devices 210. The user devices 210 may interact with the discussion forum, for example, by providing forum posts for content server device 230 to host and/or provide to the other user devices 210.

In some implementations, content server device 230 may provide the multi-user content to user devices 210, and the user devices 210 may interact via a peer-to-peer connection. For example, content server device 230 may provide a peer-to-peer protocol to the user devices 210, and the user devices 210 may execute the peer-to-peer protocol. The user devices 210 may interact via the local area network and/or via a connection between the user devices 210, such as a Bluetooth connection, a near field communication connection, or the like. For example, a first user device 210 may provide information to a second user device 210 based on the peer-to-peer connection (e.g., information describing user device 210, information describing a user of user device 210, information related to multi-user content, information to be provided to administrator device 250, etc.).

In some implementations, a particular user device 210 may host multi-user content, and may provide the multi-user content to other user devices 210. For example, the particular user device 210 may receive multi-user content from content server device 230, and may establish sessions with the other user devices 210 based on a peer-to-peer protocol. The particular user device 210 may receive interactions from the other user devices 210, and may provide modified multi-user content based on the interactions, which may conserve processor and/or network resources of content server device 230 and/or improve efficiency of providing the multi-user content.

In some implementations, content server device 230 may provide part of, or all of, the multi-user content via display 220. For example, content server device 230 may cause media to be displayed on display 220, and may enable users to interact with an element of the media via user interfaces of the user devices 210. As another example, content server device 230 may permit two or more users to interact via user interfaces of user device 210, and may display the interaction via display 220 (e.g., in a two-player game, etc.). As yet another example, content server device 230 may permit user devices 210 to provide content for display on display 220 (e.g., photo content, video content, text content, advertising, web links, etc.), and may cause display 220 to display the provided content.

As further shown in FIG. 5 process 500 may include receiving an interaction, based on the multi-user content, from one or more of the user devices (block 530). For example, content server device 230 may receive an interaction based on the multi-user content. Content server device 230 may receive the interaction from one or more user devices 210 that are connected to content server device 230 via the local area network. Content server device 230 may store and/or process the interaction, and may provide modified multi-user content based on the interaction, as described in more detail below.

Content server device 230 may receive the interaction based on an interaction with a user interface of user device 210, in some implementations. For example, a user of user device 210 may interact with an element of the multi-user content via a user interface. User device 210 may provide interaction information that identifies the interaction to content server device 230, and content server device 230 may accordingly modify the multi-user content. For example, if a user selects a product discount from a set of product discounts, user device 210 may provide information identifying the product discount to content server device 230. Based on the information identifying the product discount, content server device 230 may modify the multi-user content to indicate that the product discount has been selected by user device 210.

As another example, the interaction may identify a location of user device 210 in location 260, and content server device 230 may modify the multi-user content according to the identified location. For example, content server device 230 may identify other user devices 210 near the location of user device 210, may identify facilities near user device 210, may provide information relating to the location of user device 210, or the like. In some implementations, content server device 230 may store the interaction information, in association with information relating to user device 210 and/or a user of user device 210. In this way, content server device 230 may facilitate analysis of the interaction information, the information relating to user device 210, and/or the information relating to the user, which may permit an advertiser to determine whether the multi-user content is effective for marketing purposes.

As further shown in FIG. 5, process 500 may include providing modified multi-user content, based on the interaction, to the user devices (block 540). For example, content server device 230 may provide modified multi-user content to user devices 210. Content server device 230 may modify the multi-user content based on the interaction received from one or more of the user devices 210, and may provide the modified multi-user content to user devices 210.

For example, in a situation where content server device 230 hosts a multi-player game, content server device 230 may receive interactions with an environment of the multi-player game. Content server device 230 may modify the environment of the multi-player game, and may present modified multi-user content, based on the modified environment, to the user devices 210. As another example, in a situation where content server device 230 hosts media content, and the user devices 210 vote on particular media to view, content server device 230 may provide the particular media to the user devices 210 based on an outcome of the votes.

As further shown in FIG. 5, process 500 may include determining information to provide to an administrator device (block 550). For example, content server device 230 may determine information to provide to administrator device 250. The information may include, for example, information related to display 220, content server device 230, and/or access point 240, information related to user devices 210 and/or users of user devices 210, information related to the multi-user content, or other information. For example, content server device 230 may provide information related to location 260 and/or related to an automobile, a train car, etc. that includes location 260, such as information for diagnosing a problem with location 260, information related to operations of location 260, information related to a quantity of user devices 210 at location 260, acceleration of location 260, a location of location 260, demographic information associated with user devices 210 at location 260, or the like.

In some implementations, user device 210 may access multi-user content based on payment information, and content server device 230 may determine to provide the payment information to administrator device 250 or another device (e.g., to debit an account associated with user device 210, to verify authenticity of provided payment card information, etc.). For example, content server device 230 may be incapable of verifying authenticity of provided payment information and/or debiting an account associated with user device 210 when content server device 230 cannot connect with the Internet. In such cases, content server device 230 may receive an interaction from user device 210 to purchase multi-user content, and may receive payment information from user device 210. Content server device 230 may communicate the payment information to administrator device 250 (e.g., via one or more user devices 210 that access the Internet at a later time, when content server device 230 gains access to the Internet, etc.).

When content server device 230 determines that the payment information is authentic, approved, etc., content server device 230 may permit user device 210 to continue to access the multi-user content. When content server device 230 determines that the payment information is not authentic, declined, etc., content server device 230 may deny access to the multi-user content by user device 210. In this way, content server device 230 may control access to multi-user content by user device 210 based on payment information, which may improve revenue related to the multi-user content and/or prevent unauthorized access to the multi-user content.

In some implementations, content server device 230 may provide information related to user device 210 and/or a user of user device 210. For example, content server device 230 may provide information identifying user device 210, information identifying a subscriber account associated with user device 210, information identifying a time that user device 210 accesses the multi-user content, information input by a user, information identifying multi-user content accessed by user device 210, information identifying interests associated with user device 210 and/or a user of user device 210, a mobile device type of user device 210, one or more forms (e.g., registration forms, user information forms, etc.) that user device 210 has completed, other mobile devices 210 associated with a particular user, other user devices 210 with which a particular user device 210 interacts, or the like.

In some implementations, content server device 230 may provide information related to multi-user content. For example, when content server device 230 requires that user device 210 provide user information to access the multi-user content, content server device 230 may provide the user registration information to administrator device 250. As another example, if user device 210 selects a discount on a particular product, content server device 230 may provide information identifying the discount and/or the particular product to administrator device 250. As another example, if content server device 230 associates two user devices 210 based on the multi-user content, content server device 230 may provide information identifying the two user devices 210 and the association between the two user devices 210.

As further shown in FIG. 5, process 500 may include providing the information to the administrator device (block 560). For example, content server device 230 may provide the information to administrator device 250. In some implementations, content server device 230 may provide the information to administrator device 250 via the local area network. For example, content server device 230 may provide the information when content server device 230 detects that administrator device 250 is connected with the local area network. Additionally, or alternatively, content server device 230 may provide the information to administrator device 250 via a wired connection with administrator device 250, via physical memory exchanged between content server device 230 and administrator device 250 (e.g., a removable memory stick, a thumb drive, etc.), or the like. In some implementations, content server device 230 and/or user device 210 may provide the information to administrator device 250 based on an interaction with an application programming interface of administrator device 250, which may improve efficiency of interacting with administrator device 250 and/or administering a multi-user content system.

In some implementations, content server device 230 may provide the information to one or more user devices 210 in order to provide the information to administrator device 250. The one or more user devices 210 may provide the information to administrator device 250. For example, since location 260 is associated with no Internet access or limited Internet access, the one or more user devices 210 may provide the information to administrator device 250 when the one or more user devices 210 move to a location with access to adequate cellular coverage and/or access to another network (e.g., the Internet, a wireless local area network associated with administrator device 250, etc.). In this way, content server device 230 may provide information to administrator device 250 via user device 210, which may permit content server device 230 to provide information to administrator device 250 without sharing a connection (e.g., a local area network connection, a cellular connection, an Internet connection, etc.) with administrator device 250.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6I are diagrams of an example implementation 600 relating to example process 400 shown in FIG. 4, and relating to example process 500 shown in FIG. 5. FIGS. 6A-6I show an example of configuring a content server device and a display to provide multi-user content, and of providing the multi-user content to user devices. For the purpose of FIGS. 6A-6I, assume that location 260, and a local area network provided by access point 240, are isolated from Internet connectivity.

Figure 6A:
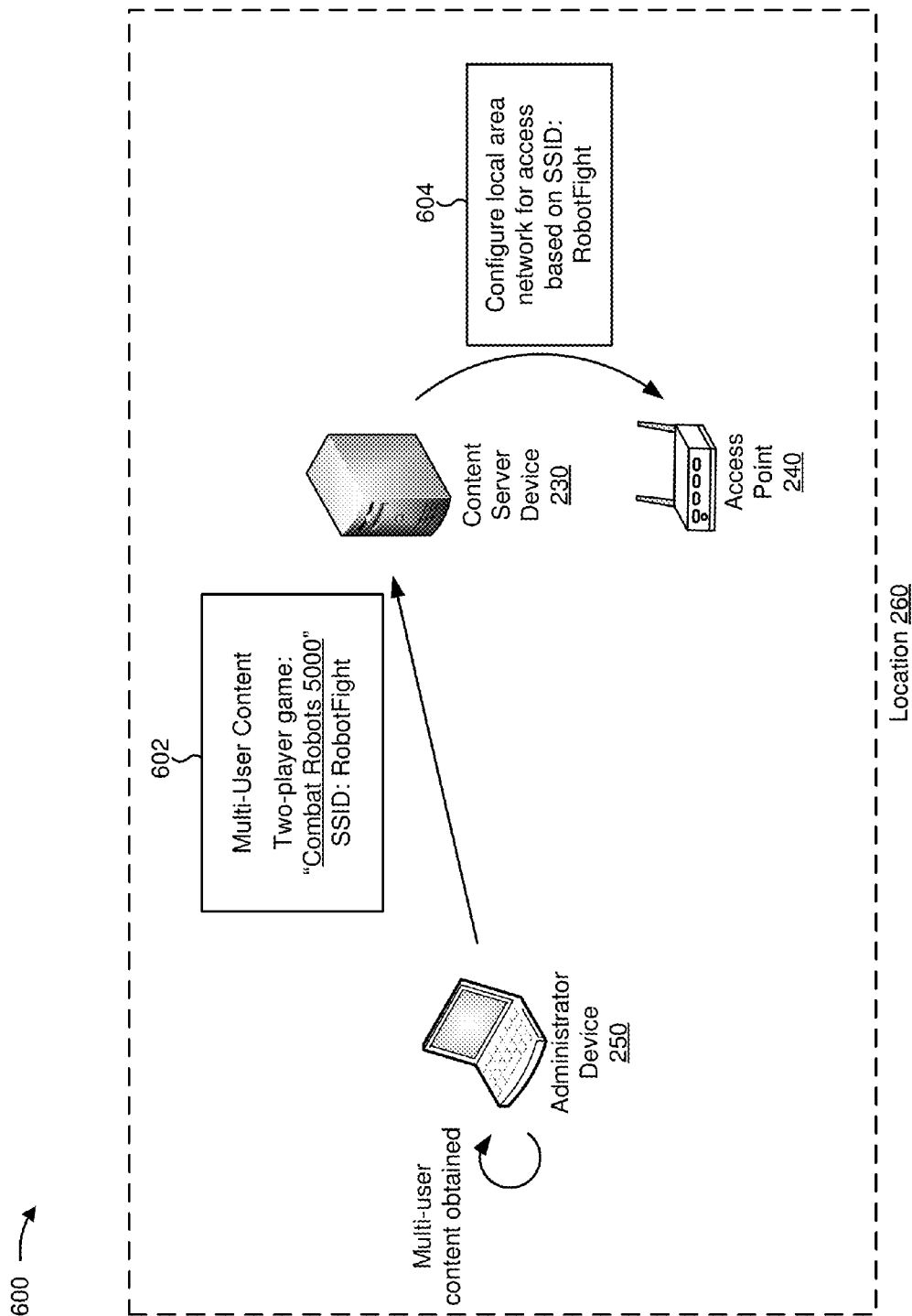
FIGS. 6A-6I are diagrams of an example implementation relating to the example processes shown in FIGS. 4 and 5.

As shown in FIG. 6A, administrator device 250 may obtain multi-user content. Here, the multi-user content includes a two-player game entitled "Combat Robots 5000," and is associated with connection information that identifies an SSID for the multi-user content (e.g., "RobotFight"). As shown by reference number 602, administrator device 250 may provide the multi-user content and the connection information to content server device 230. Assume that content server device 230 receives the multi-user content and the connection information via access point 240, and assume that content server device 230 stores the multi-user content and the connection information. As shown by reference number 604, content server device 230 may configure access point 240 to provide a local area network that may be accessed based on the connection information (e.g., the SSID of "RobotFight").

Figure 6B:
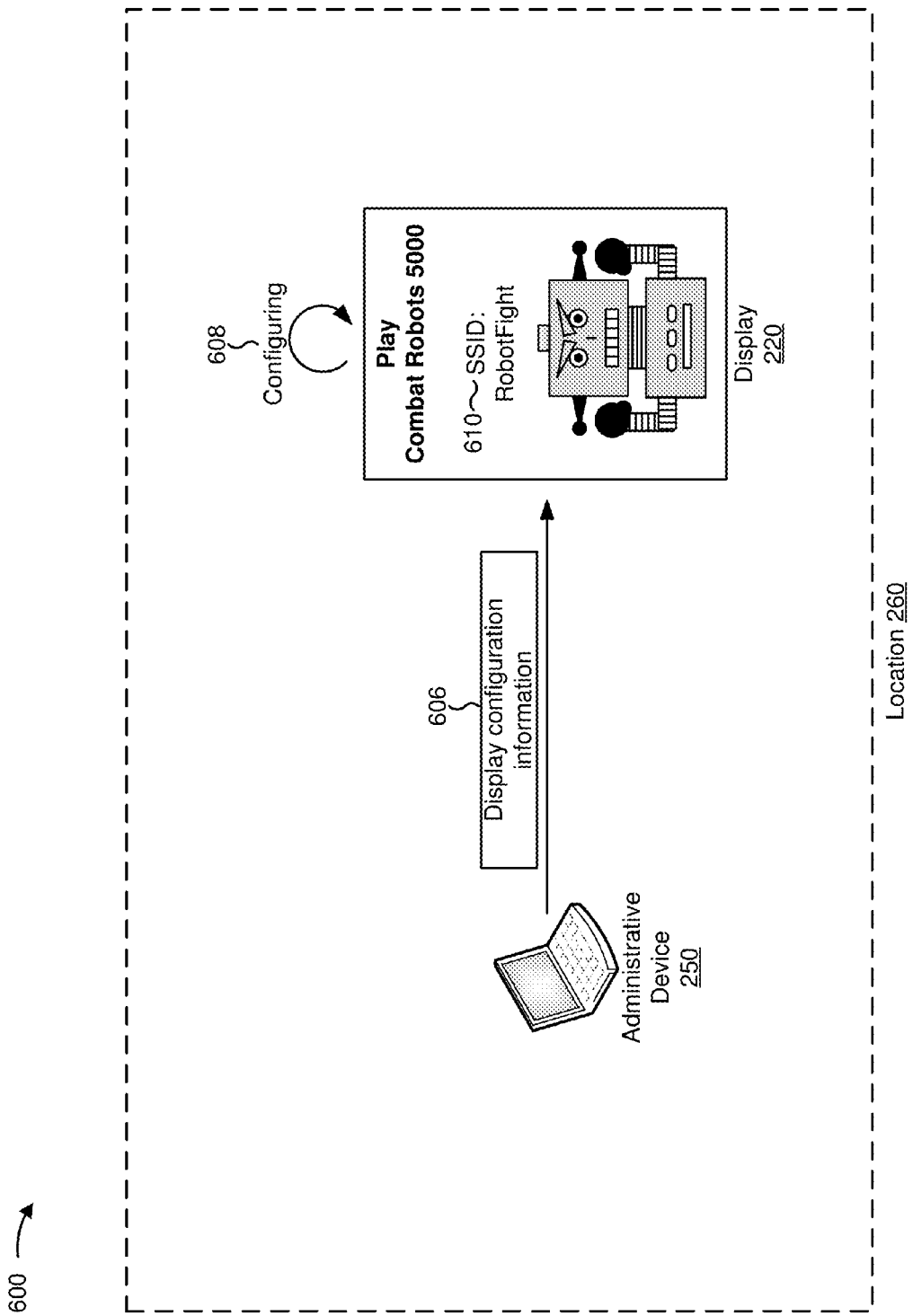

As shown in FIG. 6B, and by reference number 606, administrator device 250 may provide display configuration information to display 220. As shown by reference number 608, based on the display configuration information, display 220 may be configured. Here, as shown, display 220 provides information related to the multi-user content. As shown by reference number 610, display 220 provides the connection information. Here, display 220 provides the SSID of "RobotFight." As shown, display 220 provides information in association with the connection information (e.g., a visual representation of a robot).

Figure 6C:
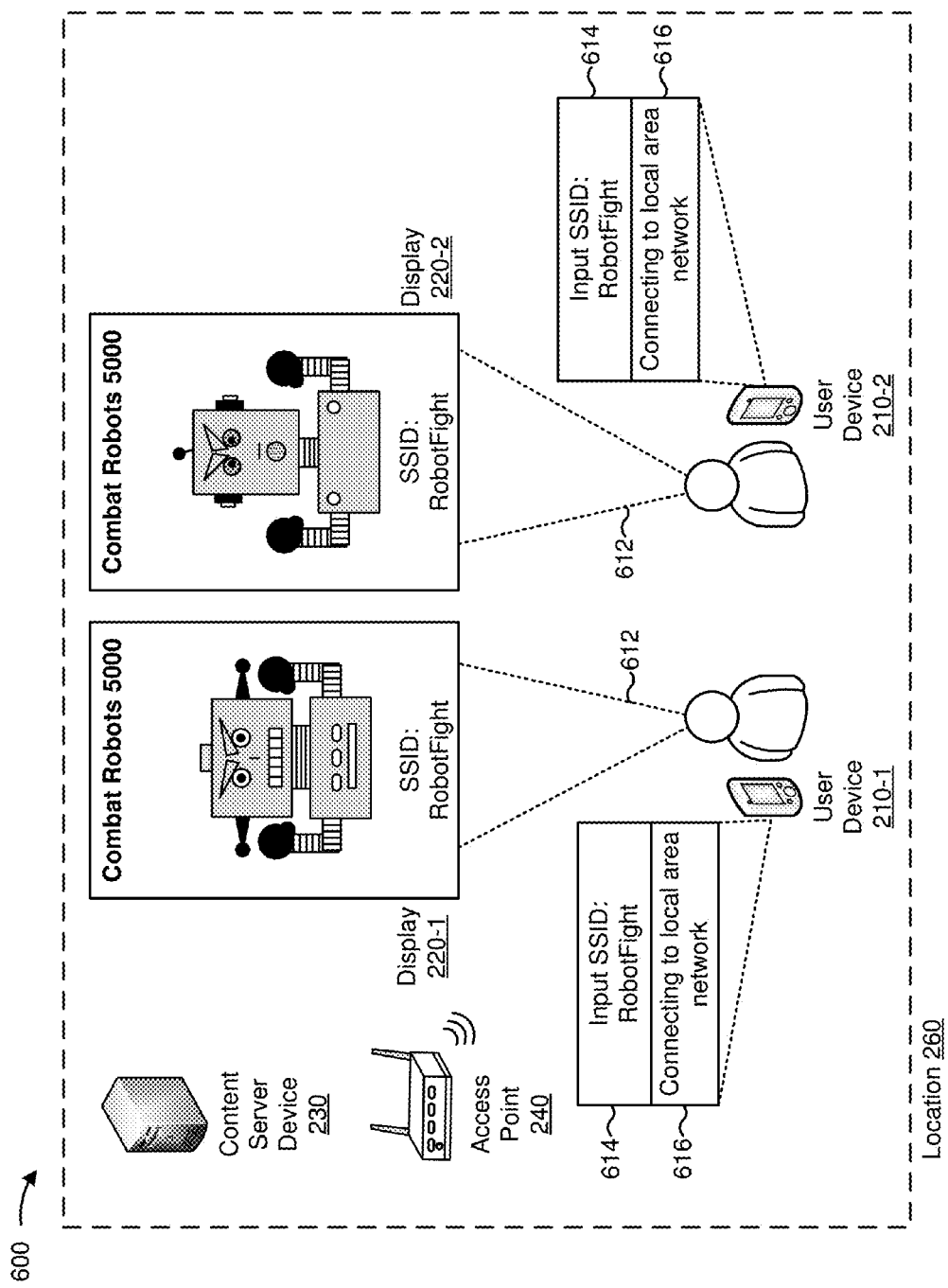

As shown in FIG. 6C, and by reference number 612, users of user devices 210-1 and 210-2 may view displays 220-1 and 220-2. Here, a user of user device 210-1 views display 220-1, and a user of user device 210-2 views display 220-2. As shown by reference number 614, user devices 210-1 and 210-2 may receive input, from the users, that includes the connection information identified by displays 220-1 and 220-2 (e.g., the SSID of "RobotFight"). As shown by reference number 616, user devices 210-1 and 210-2 may attempt to connect to a local area network provided by access point 240 based on the SSID. Assume that user devices 210-1 and 210-2 successfully connect to the local area network.

In some implementations, user device 210-1 may connect to the local area network based on display 220, and may provide an invitation to user device 210-2 to access the multi-user content. For example, user device 210-1 may provide a push notification to user device 210-2 including connection information for the multi-user content, and user device 210-2 may input the connection information. Additionally, or alternatively, user device 210-2 may log onto the local area network based on connection information, and may receive an invitation to access the multi-user content with user device 210-1 based on logging onto the local area network. In this way, user device 210-1 may invite another user device 210 to access the multi-user content, which may increase consumption of the multi-user content and, thus, generate additional analytic information.

Figure 6D:
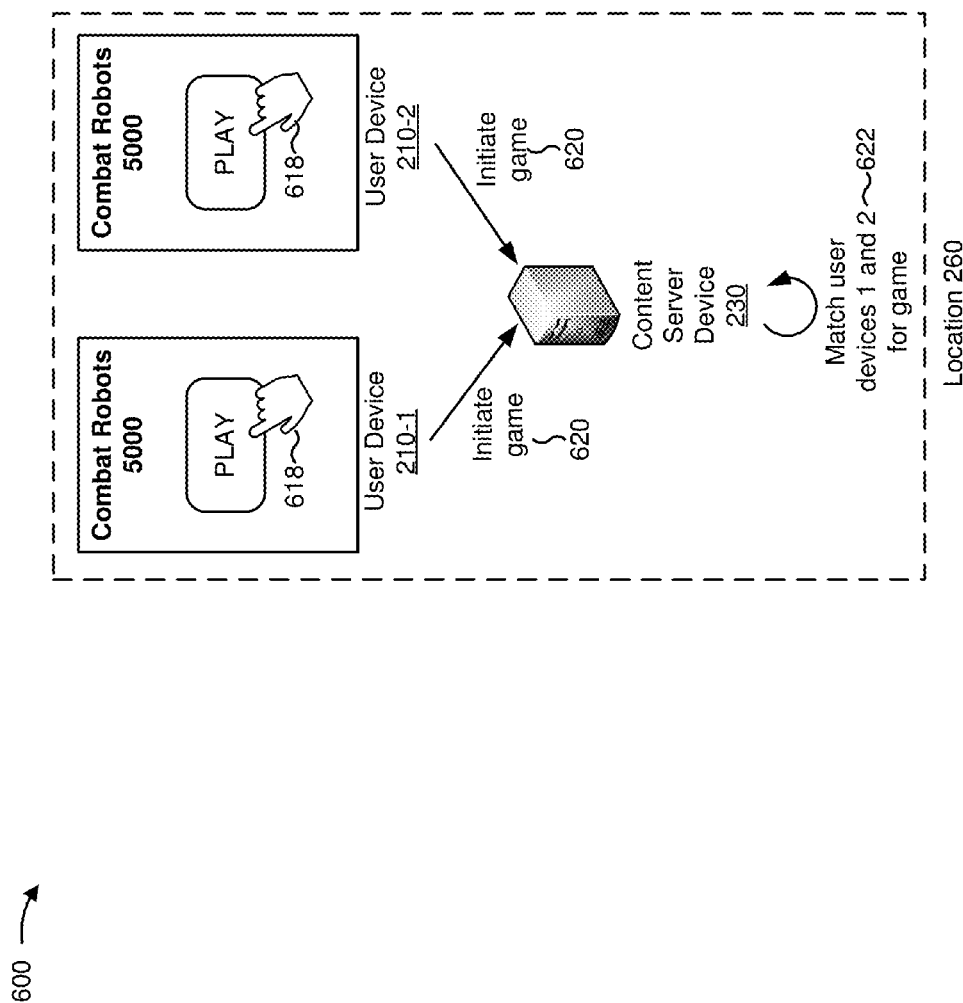

As shown in FIG. 6D, and by reference number 618, users of user devices 210-1 and 210-2 may interact with user interfaces of user devices 210-1 and 210-2 to request multi-user content. As shown by reference number 620, based on the user interactions, user devices 210-1 and 210-2 may request the multi-user content from content server device 230. As shown by reference number 622, based on receiving the requests via the local area network, content server device 230 may match user devices 210-1 and 210-2, and may provide the multi-player game to user devices 210-1 and 210-2.

Figure 6E:
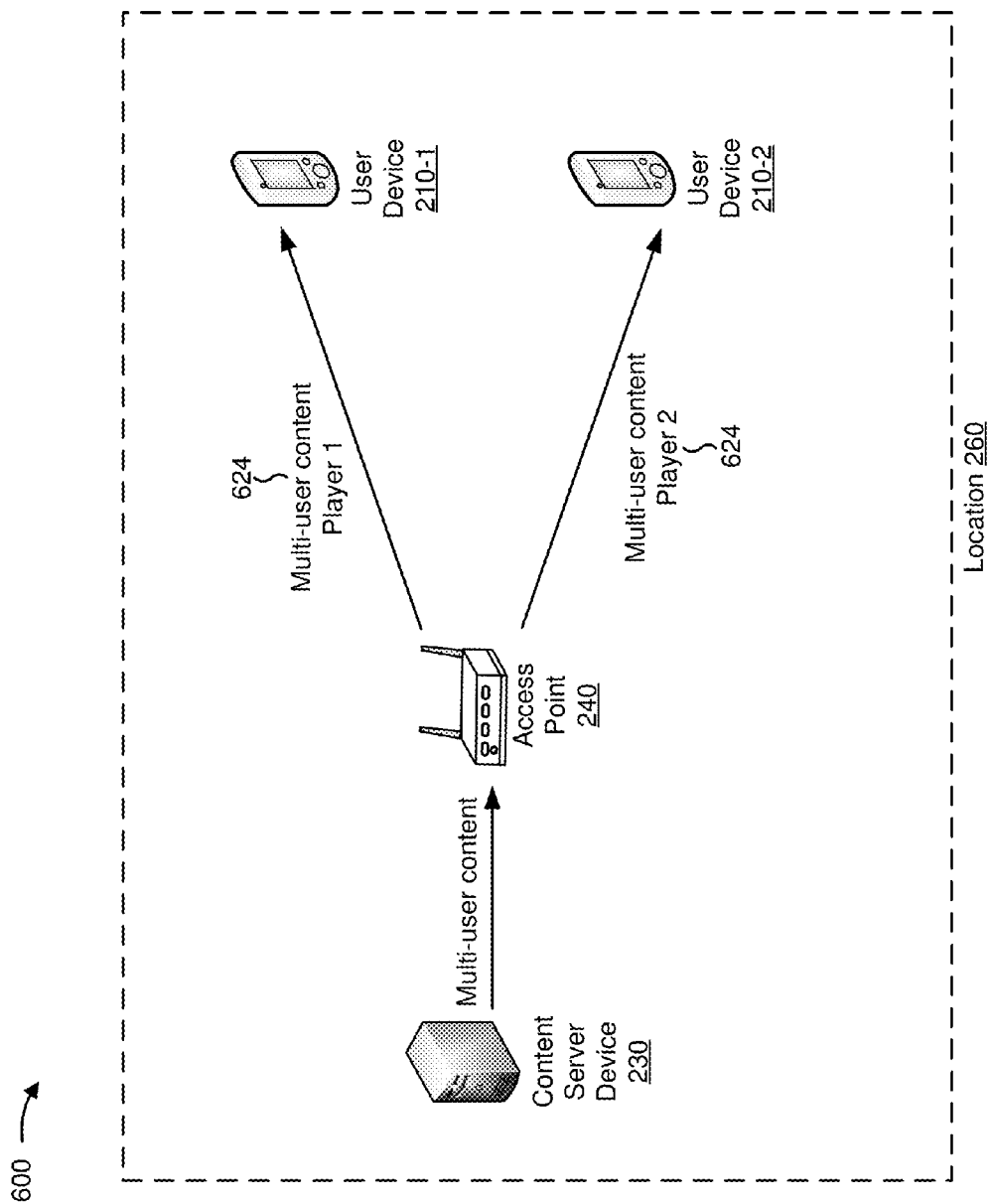

As shown in FIG. 6E, and by reference number 624, content server device 230 may provide the multi-user content to user devices 210-1 and 210-2. Here, content server device 230 provides multi-user content associated with player 1 of "Combat Robots 5000" to user device 210-1, and content server device 230 provides multi-user content associated with player 2 of "Combat Robots 5000" to user device 210-2.

Figure 6F:
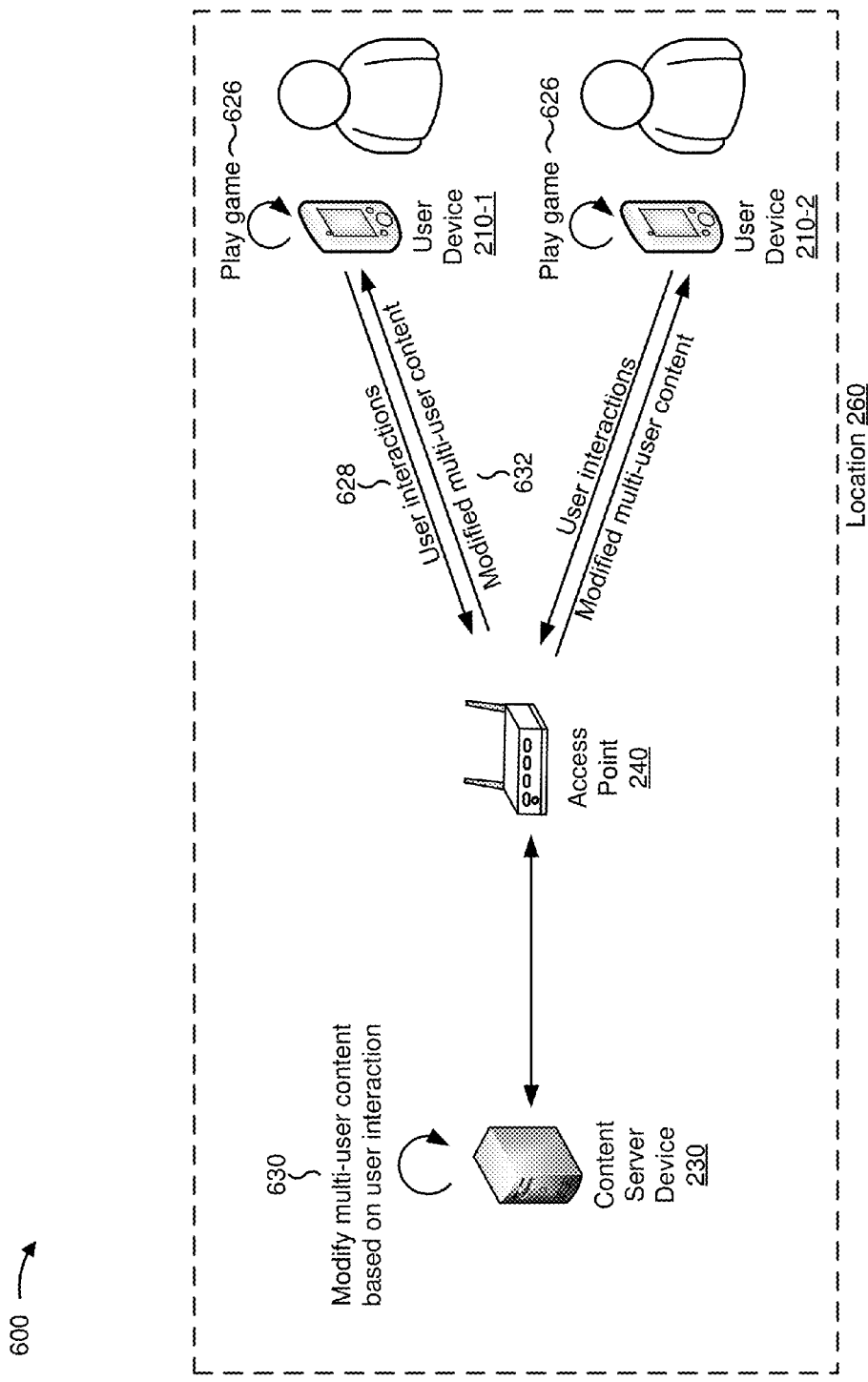

As shown in FIG. 6F, and by reference number 626, users associated with user devices 210-1 and 210-2 may interact with the multi-user content (e.g., may play the two-player game). As shown by reference number 628, user devices 210-1 and 210-2 may provide information identifying the user interactions to content server device 230 (e.g., via access point 240). As shown by reference number 630, content server device 230 may modify the multi-user content based on the user interactions. For example, content server device 230 may store a score of the two-player game, may store information related to user devices 210-1 and 210-2, may generate media to provide in association with the multi-user content, or the like. As shown by reference number 632, content server device 230 may provide modified multi-user content to user devices 210-1 and 210-2. By providing the multi-user content and the multi-user content to user devices 210 via a local area network, content server device 230 may improve bandwidth and/or latency related to the multi-user content, as compared to a bandwidth and/or latency which the user devices 210 may achieve via a cellular data connection. By improving the bandwidth and/or latency, content server device 230 may improve a user experience, reduce buffering of the multi-user content, and/or increase user interaction with the multi-user content.

Figure 6G:
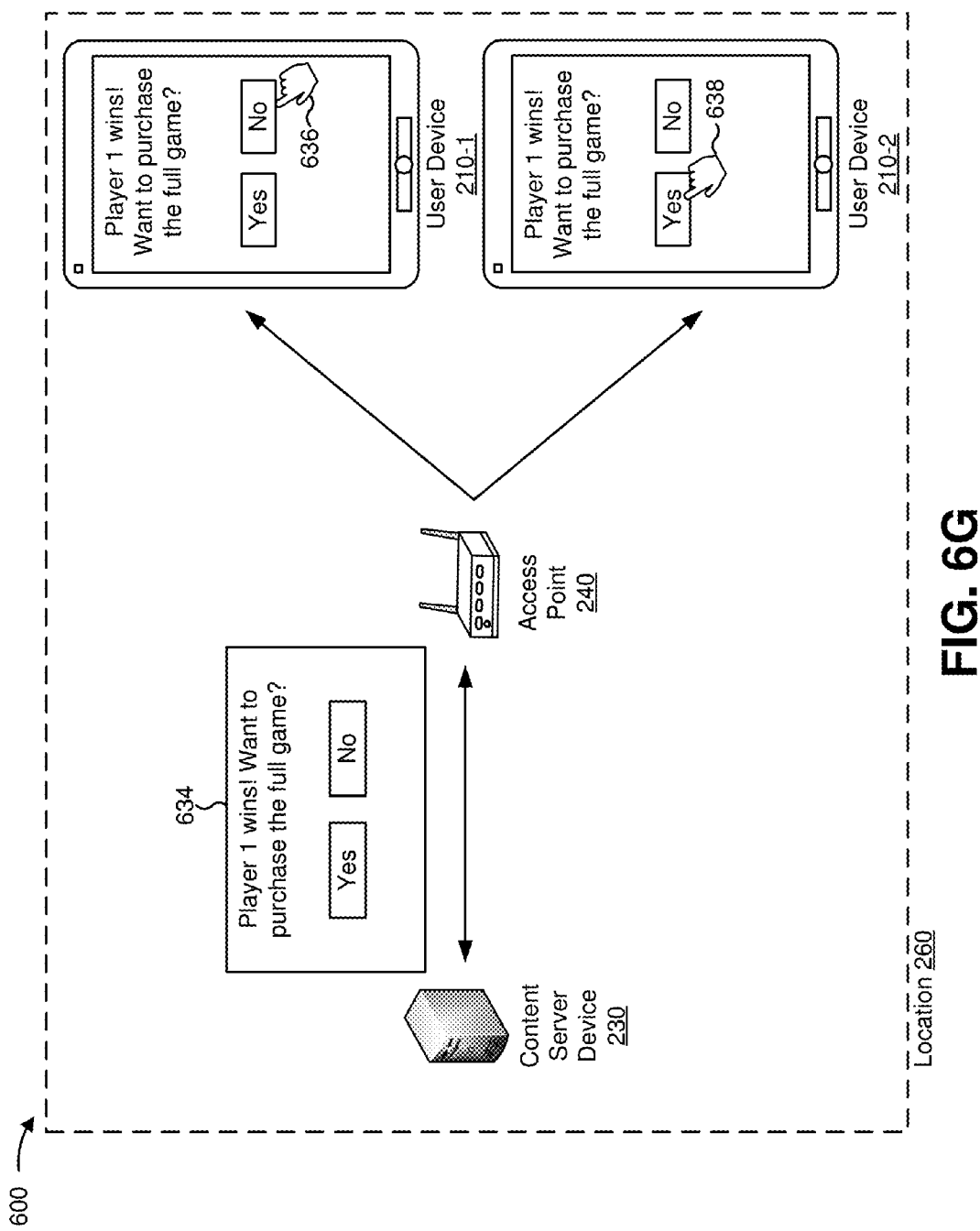

As shown in FIG. 6G, and by reference number 634, user device 210-1, associated with Player 1, may win the two-player game. As shown, content server device 230 may query whether users associated with user devices 210-1 and 210-2 want to purchase the full game of Combat Robots 5000. As shown by reference number 636, user device 210-1 does not choose to purchase the game. As shown by reference number 638, user device 210-2 chooses to purchase the game.

Figure 6H:
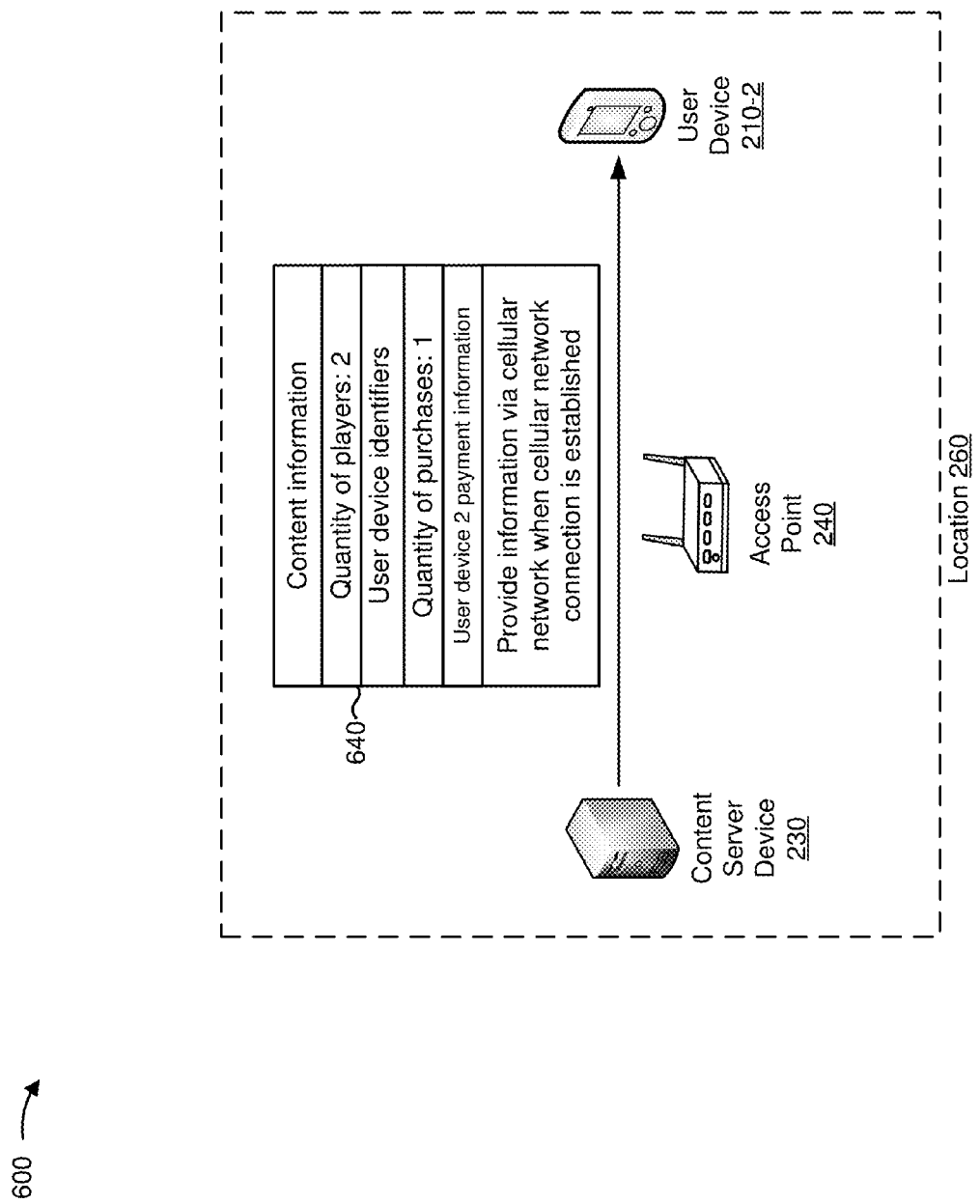

As shown in FIG. 6H, and by reference number 640, content server device 230 may cause user device 210-2 to provide content information related usage of the multi-user content (e.g., a quantity of players associated with "Combat Robots 5000," user device identifiers of user devices 210-1 and 210-2, a quantity of user devices 210 that purchased "Combat Robots 5000," and payment information for user device 210-2, such as a credit card number, a user account number, or the like) via cellular network 270. As further shown, content server device 230 may cause user device 210-2 to provide the content information when a connection with cellular network 270 is established (e.g., based on no cellular network connection being available for user device 210-2 and content server device 230 when content server device 230 provides the content information to user device 210).

Figure 6I:
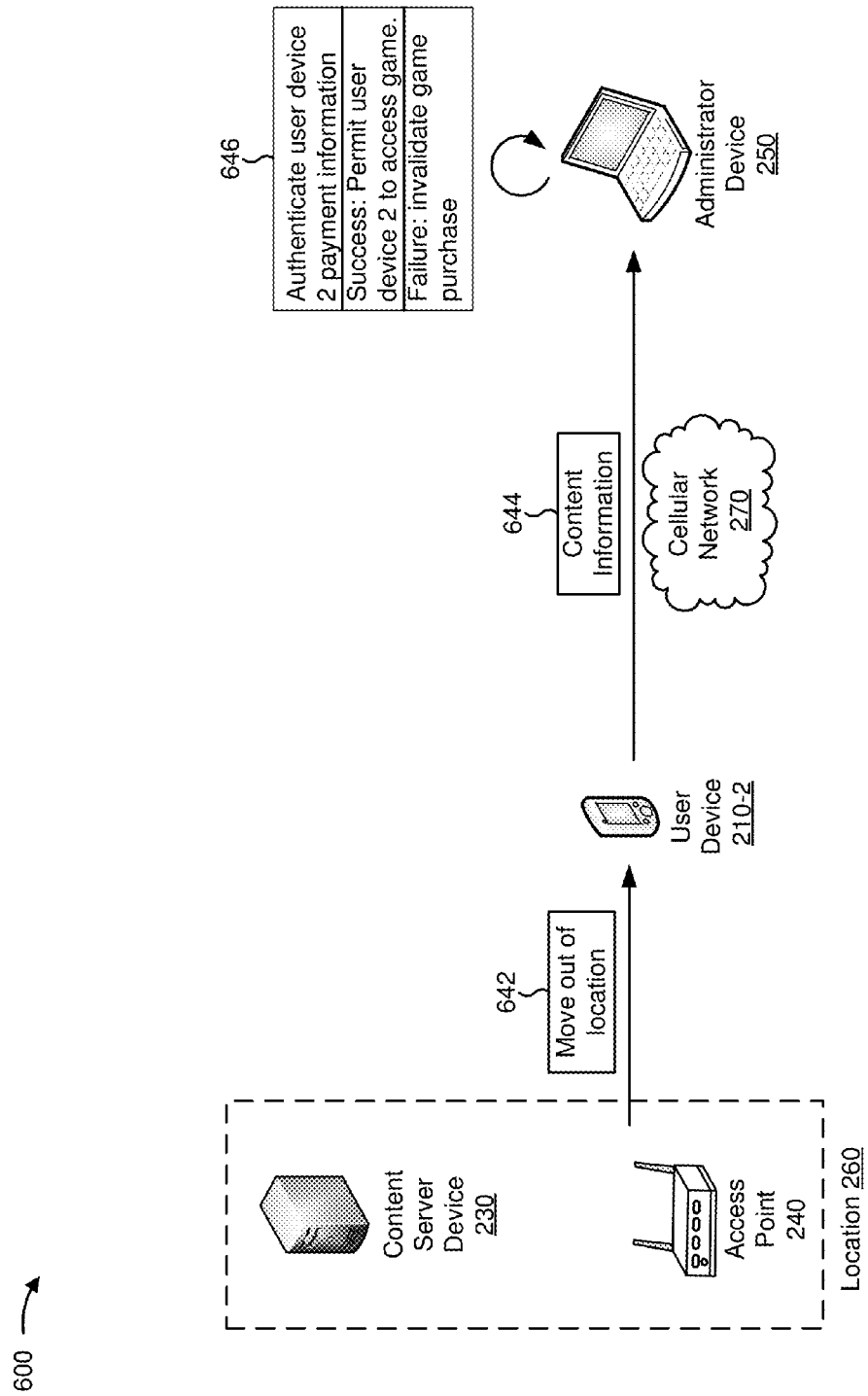

As shown in FIG. 6I, and by reference number 642, user device 210-2 may move out of location 260 and/or the local area network. As shown by reference number 644, user device 210-2 may establish a connection with cellular network 270, and may provide the content information to administrator device 250 via the connection with cellular network 270. As shown by reference number 646, administrator device 250 may be located away from location 260. For example, administrator device 250 may be a portable device, may be associated with a central station, or the like, and administrator device 250 may have moved away from location 260 after performing the operations shown in FIG. 6A. Additionally, or alternatively, administrator device 250 may have provided the multi-user content to content server device 230 via user device 210. For example, administrator device 250 may have provided the multi-user content to user device 210 via cellular network 270, and user device 210 may have moved to location 260 and provided the multi-user content to content server device 230.

As further shown by reference number 646, administrator device 250 may authenticate payment information received from user device 210-2 based on user device 210-2 purchasing the multi-player game. As shown, when administrator device 250 successfully authenticates payment information of user device 210-2, administrator device 250 may permit user device 210-2 to continue to access the multi-player game. As further shown, when administrator device 250 fails to authenticate the payment information (e.g., based on insufficient funds associated with user device 210-2, based on an incorrect credit card number, based on an insufficient quantity of tokens associated with an account of user device 210-2, etc.), administrator device 250 may invalidate the purchase of user device 210-2. In this way, administrator device 250 may control access, by user device 210-2, to multi-user content that is purchased in a situation where user device 210-2 does not have Internet connectivity. Thus, administrator device 250 may increase sales of multi-user content and may increase a variety of situations in which user device 210 may purchase multi-user content.

As indicated above, FIGS. 6A-6I are provided merely as an example. Other examples are possible and may differ from what was described with regard to FIGS. 6A-6I.

Figure 7:
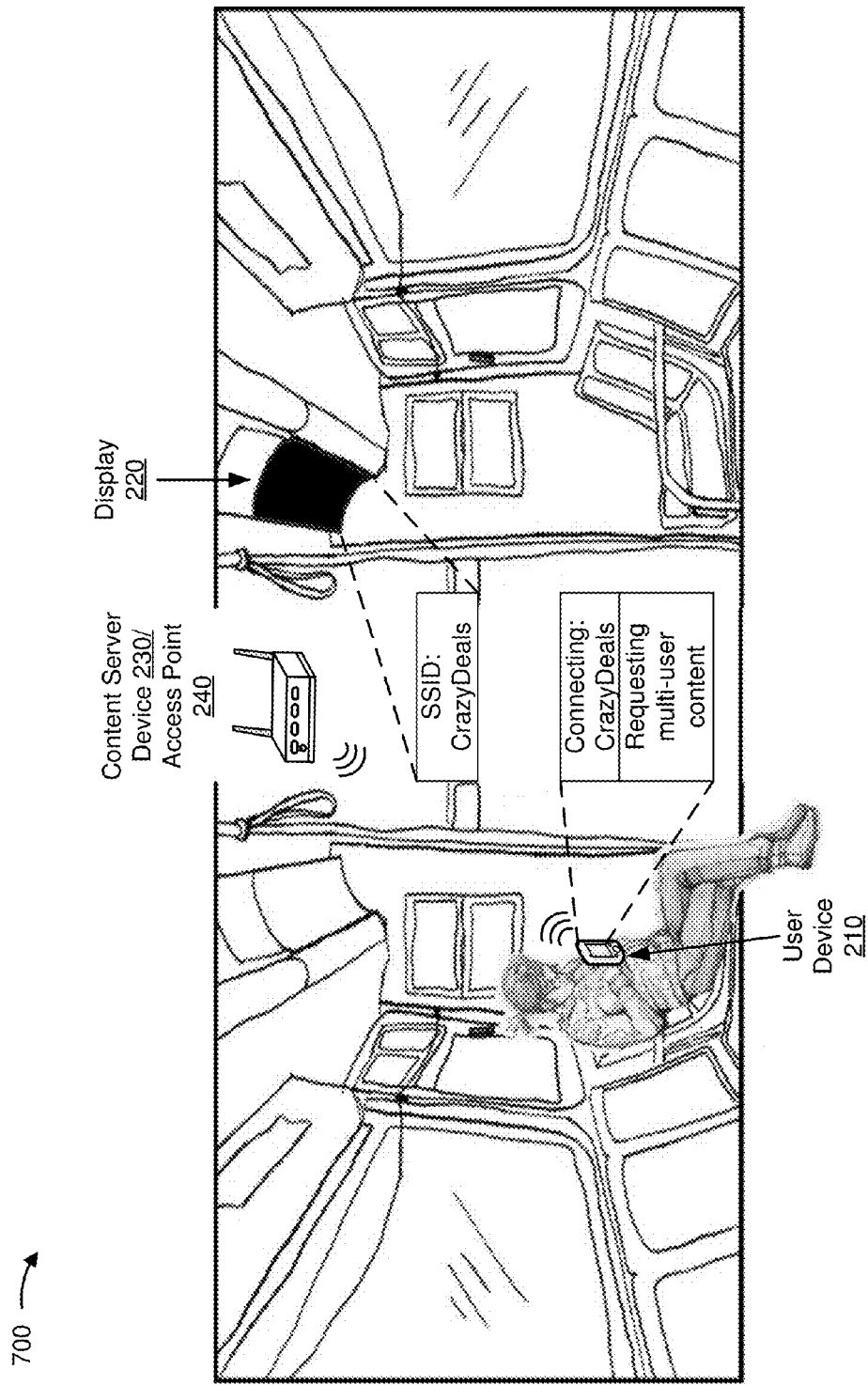
FIG. 7 is a diagram of an example implementation relating to the example processes shown in FIGS. 4 and 5.

FIG. 7 is a diagram of an example implementation 700 relating to example process 400 shown in FIG. 4, and relating to example process 500 shown in FIG. 5. FIG. 7 shows an example of a display and a content server device in a location including a train car. For the purpose of FIG. 7, assume that location 260 (i.e., the train car), and a local area network provided by access point 240, are isolated from Internet connectivity.

As shown in FIG. 7, location 260 (i.e., the train car) may include display 220. As shown, display 220 may be configured to provide connection information. Here, display 220 provides an SSID of "CrazyDeals" which may correspond to multi-user content to be provided by content server device 230. As further shown, location 260 may include content server device 230 and access point 240.

As shown, a user of user device 210 may view the connection information provided by display 220, and may input the connection information to user device 210. As shown, user device 210 may connect with access point 240 based on the connection information, and may request multi-user content from content server device 230. Assume that content server device 230 provides the multi-user content based on the request. In this way, content server device 230 may provide multi-user content to users on train cars that are isolated from Internet connectivity, which may increase user interaction with the multi-user content and, thus, provide more information related to usage of the multi-user content than when user devices 210 have Internet connectivity.

As indicated above, FIG. 7 is provided merely as an example. Other examples are possible and may differ from what was described with regard to FIG. 7.

Figure 8:
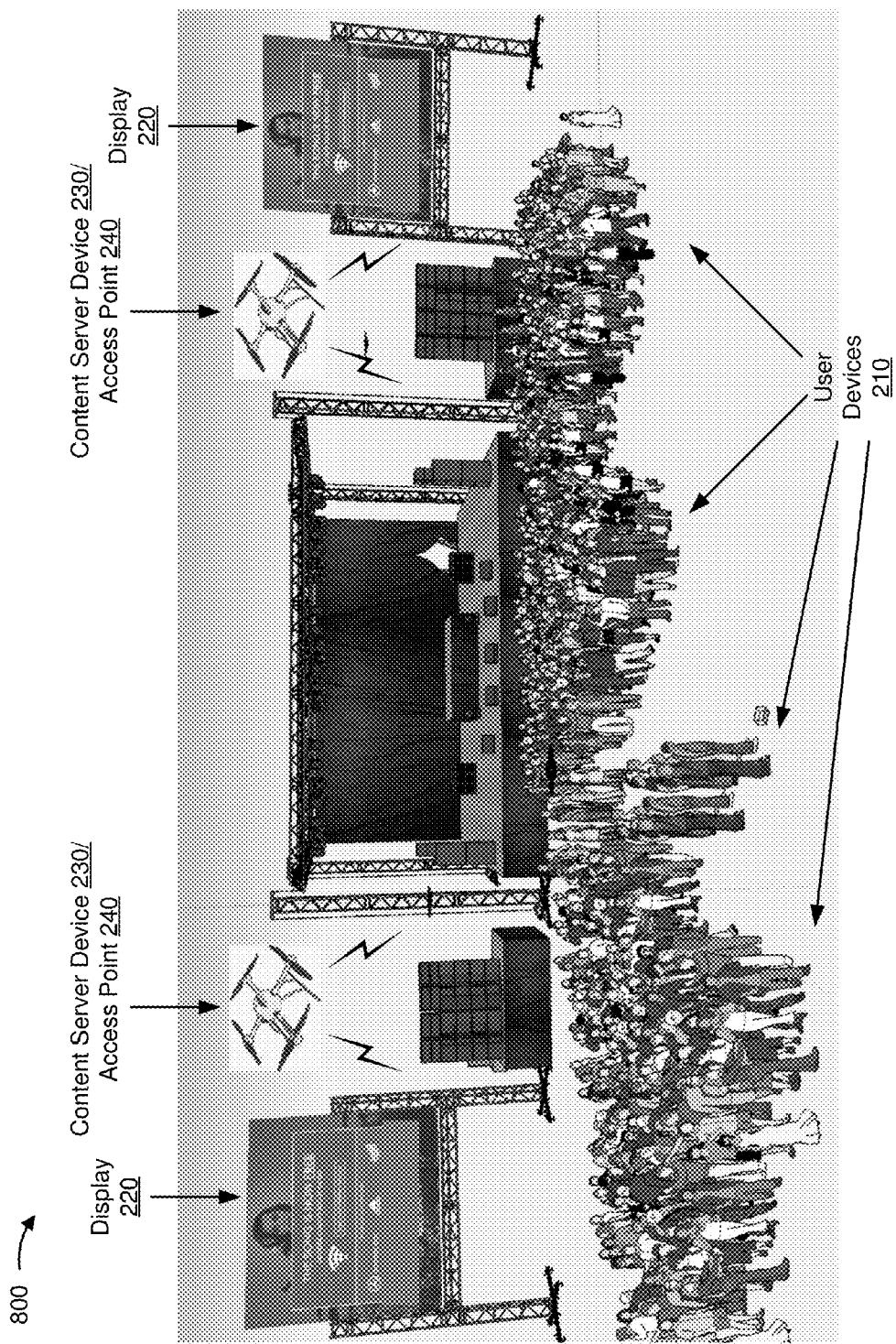
FIG. 8 is a diagram of an example implementation relating to the example processes shown in FIGS. 4 and 5.

FIG. 8 is a diagram of an example implementation 800 relating to example process 400 shown in FIG. 4, and relating to example process 500 shown in FIG. 5. FIG. 8 shows an example of a display and a content server device in a location including a gathering. For the purpose of FIG. 8, assume that location 260 (i.e., the gathering), and a local area network provided by access point 240, are isolated from Internet connectivity.

As shown in FIG. 8, location 260 (i.e., the gathering) may include displays 220. As further shown, the displays 220 may include information relating to multi-user content (e.g., a song that is available for users of user devices 210 to download for free at location 260) and connection information for connecting to content server device 230 and/or access point 240. As shown, content server devices 230 and/or access points 240 may be included in unmanned aerial vehicles. As further shown, multiple unmanned aerial vehicles provide a local area network for location 260, which may increase an effective area of location 260 and increase a quantity of user devices 210 reachable by access points 240. Assume that the user devices 210 connect to access points 240 based on connection information provided by displays 220, and assume that the user devices 210 request the multi-user content (e.g., the free song) from content server devices 230. In this way, content server device 230 may provide multi-user content to a group of users at a gathering via access point 240, included in an unmanned aerial vehicle, which may improve reception and/or coverage of the local area network.

As indicated above, FIG. 8 is provided merely as an example. Other examples are possible and may differ from what was described with regard to FIG. 8.

Figure 9:
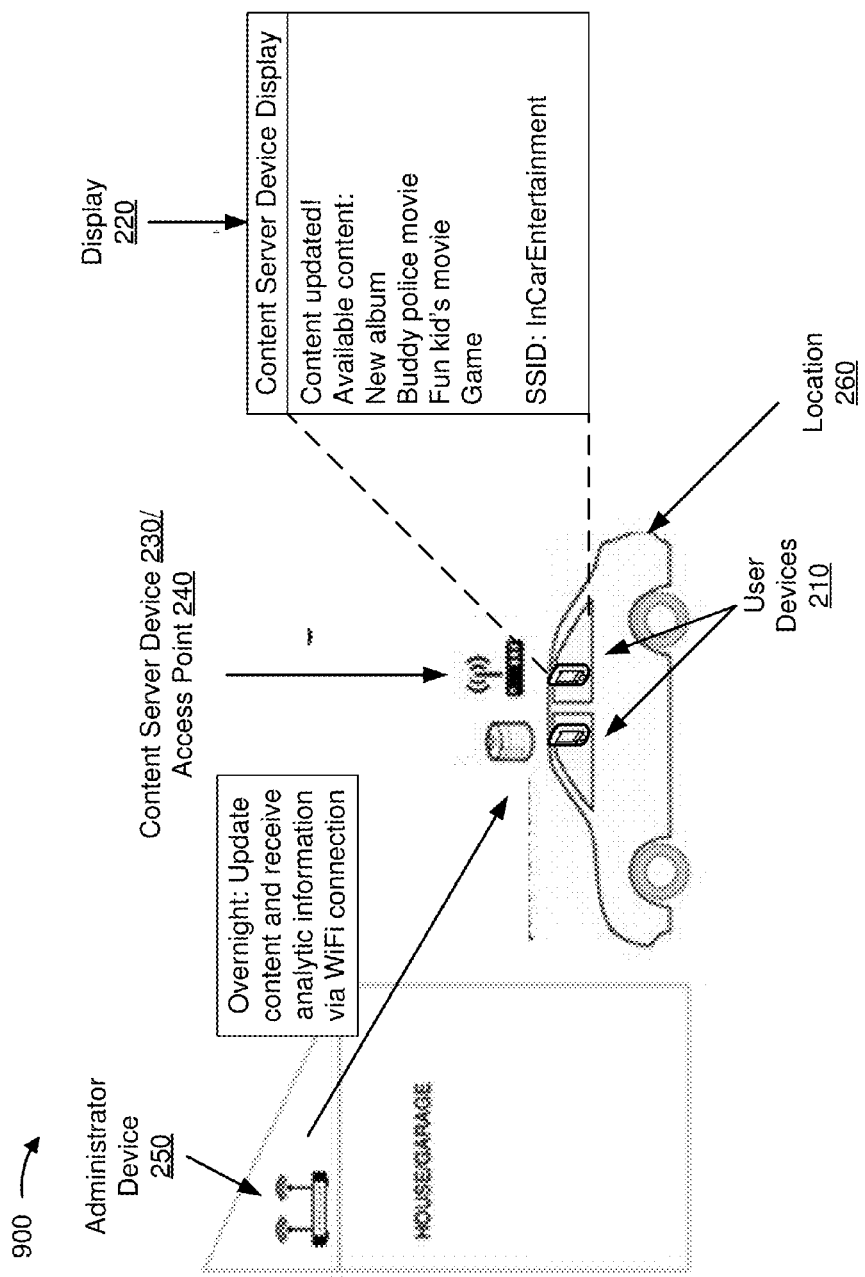
FIG. 9 is a diagram of an example implementation relating to the example processes shown in FIGS. 4 and 5.

FIG. 9 is a diagram of an example implementation 900 relating to example process 400 shown in FIG. 4, and relating to example process 500 shown in FIG. 5. FIG. 9 shows an example of a content server device in a vehicle, which communicates with an administrator device when parked in a home garage.

As shown in FIG. 9, administrator device 250 may be located at a house. For example, administrator device 250 may include a WiFi router, a set top box, or the like, and may provide multi-user content to content server device 230. As further shown, content server device 230 and access point 240 are located in a vehicle. Assume that the vehicle parks in the garage at night, and assume that content server device 230/access point 240 are capable of connecting with administrator device 250 when the vehicle is parked in the garage.

As shown, when the vehicle is parked in the garage, administrator device 250 may provide content to content server device 230/access point 240 and may receive analytic information (e.g., related to user device 210, related to content accessed by user device 210, related to information input by user device 210, etc.) from content server device 230. As further shown, the vehicle (i.e., location 260) may include a local area network with an SSID of "InCarEntertainment." As shown, the vehicle may include display 220.

Assume that display 220 is provided via a display in the car (e.g., a heads up display, a seat back television screen, etc.).

As shown, display 220 may provide information identifying multi-user content obtained from administrator device 250. Here, the multi-user content may include "New album," "Buddy police movie," "Fun kid's movie," and "Game." User devices 210 may input the SSID of InCar-Entertainment, and may access the multi-user content. By providing the multi-user content via content server device 230, rather than via a cellular data connection, content server device 230 may conserve cellular data of user devices 210, and may provide the multi-user content at a greater bandwidth than user devices 210 may achieve via the cellular data connection. In this way, content server device 230 may prevent buffering of the multi-user content, which may increase user interaction, and may gather analytic data related to consumption of the multi-user content by user devices 210.

As indicated above, FIG. 9 is provided merely as an example. Other examples are possible and may differ from what was described with regard to FIG. 9.

In this way, content server device 230 may provide multi-user content to user devices 210 in a situation where the user devices 210 are isolated from access to network 270. In such a situation, user devices 210 may interact more extensively with the multi-user content than when the user devices 210 have access to network 270, which may improve effectiveness of advertising provided in the multi-user content, may improve accuracy of data gathered in association with the multi-user content, may reduce buffering of the multi-user content due to insufficient bandwidth via a cellular network, and may conserve cellular data associated with the user devices 210.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

To the extent that implementations described herein collect, store, or use personal information provided by individuals, it should be understood that such information shall be used in accordance with all applicable laws concerning protection of personal information. Storage and use of personal information may be in an appropriately secure manner commensurate with the type of information, for example, through various encryption and anonymization techniques for particularly sensitive information. Additionally, the collection, storage, and employment of such personal information may be subject to consent of the individual to such activities, for example, through well known "opt-in" or "opt-out" processes as may be appropriate for the situation and type of personal information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
obtain information related to multi-user content,
the multi-user content facilitating an interaction between users of different user devices, and
the multi-user content to be provided via a local area network;
store the multi-user content in local storage;
receive a request to establish a connection, via the local area network, with two or more user devices,
the request including connection information that is available from a display that is located at a location,
the connection information being provided via a push notification, and
the device, and the two or more user devices, being located at the location,
the location including an area with at least one of:
no Internet connectivity,
no cellular coverage,
limited cellular coverage, or
limited Internet connectivity, and
the location being in range of the local area network;

establish the connection, via the local area network, with the two or more user devices based on the connection information;
provide the multi-user content to the two or more user devices via the established connection;
provide an interface, for interacting with the multi-user content, to the two or more user devices via the established connection;
receive information, regarding an interaction with the interface, from at least one user device of the two or more user devices;
identify a particular location, of the at least one user device, within the location based on receiving the information; and
modify the multi-user content based on identifying the particular location.

2. The device of claim 1, where the one or more processors are further to:
cause the display to provide information based on the multi-user content.

3. The device of claim 1, where the connection information includes one or more credentials for connecting to the local area network; and
where the one or more processors, when providing the multi-user content, are to:
provide the multi-user content based on the connection information,
the connection information being associated with the multi-user content.

4. The device of claim 1, where the multi-user content includes at least one of:
advertising content,
visual information,
textual information,
audible information,
an image,
a video,
a game,
a form, to be completed by a user and/or a user device, of the two or more user devices, or
an application.

5. The device of claim 1, where the information is first information; and
where the one or more processors are to:
determine second information to provide to another device,
the other device not being in range of the local area network;
provide the second information to a user device, of the two or more user devices; and
configure the user device to provide the second information to the other device via another network,
the other network being different than the local area network associated with the location.

6. The device of claim 5, where the second information relates to accessing the multi-user content; and
where the one or more processors, when configuring the user device, are to:
configure the user device to provide the second information to the other device via an Internet,
the other network being capable of accessing the Internet.

7. The device of claim 1, where the request includes payment information.

8. A computer-readable medium storing instructions, the instructions comprising:
one or more instructions that, when executed by one or more processors of a device, cause the one or more processors to:
obtain multi-user content,
the multi-user content facilitating an interaction between users of different user devices, and
the multi-user content to be provided via a local area network;
store the multi-user content in local storage;
receive a request to establish a connection, via the local area network, with one or more user devices,
the request including connection information that is available from a display that is located at a location,
the device, and the one or more user devices, being located at the location, and
the location being associated with at least one of:
no Internet connectivity,
no cellular coverage,
limited cellular coverage, or
limited Internet connectivity, and
the location being in range of the local area network;
establish the connection, via the local area network, with the one or more user devices based on the connection information;
provide the multi-user content to the one or more user devices via the established connection;
provide an interface, for interacting with the multi-user content, to the one or more user devices via the established connection;
receive information, regarding an interaction with the interface, from the one or more user devices;
identify a particular location, of the one or more user devices, within the location based on receiving the information; and
modify the multi-user content based on identifying the particular location.

9. The computer-readable medium of claim 8, where the connection information includes one or more credentials for connecting to the local area network; and
where the one or more instructions, that cause the one or more processors to provide the multi-user content, cause the one or more processors to:
provide the multi-user content based on the connection information,
the connection information being associated with the multi-user content.

10. The computer-readable medium of claim 8, where the one or more instructions, that cause the one or more processors to obtain the multi-user content, cause the one or more processors to:
obtain the multi-user content from a user device,
the user device obtaining the multi-user content from another device located away from the location.

11. The computer-readable medium of claim 8, where the one or more instructions, when executed by the one or more processors, further cause the one or more processors to:
receive user information from the one or more user devices,
the one or more user devices providing the user information in order to access the multi-user content, and
the user information being associated with one or more users of the one or more user devices.

12. The computer-readable medium of claim 8, where the local area network includes a WiFi network; and where the connection information includes a service set identifier for connecting to the WiFi network.

13. The computer-readable medium of claim 8, where the display visually displays the connection information.

14. The computer-readable medium of claim 8, where the connection information is scannable via the display.

15. A method, comprising:
receiving, by a device, multi-user content,
the multi-user content facilitating an interaction between users of different user devices, and
the multi-user content to be provided via a local area network;
storing, by the device and in local storage, the multi-user content;
receiving, by the device and via the local area network, a request to establish a connection with one or more user devices,
the request including connection information that is obtained from a display that is located at a location,
the device, and the one or more user devices, being located at the location,
the connection information being associated with the multi-user content,
the location being associated with at least one of:
no Internet connectivity,
no cellular coverage,
limited cellular coverage, or
limited Internet connectivity, and
the location being in range of the local area network;
establishing, by the device and via the local area network, the connections with the one or more user devices based on the connection information;
providing, by the device, the multi-user content to the one or more user devices via the established connection;
providing, by the device, an interface for interacting with the multi-user content, to the one or more user devices via the local area network;
receiving, by the device, information regarding an interaction with the interface, from the one or more user devices;
identifying, by the device, a particular location of the one or more user devices, within the location based on receiving the information; and
modifying, by the device, the multi-user content based on identifying the particular location.

16. The method of claim 15, where the connection information is first connection information;
where the multi-user content is first multi-user content; and
where the method further comprises:
receiving, from another user device, second connection information,
the second connection information being obtained from the display,
the second connection information being associated with second multi-user content, and
the other user device being a different user device than the one or more user devices;
establishing a connection with the other user device based on the second connection information; and
providing the second multi-user content to the other user device based on the second connection information.

17. The method of claim 15, where providing the multi-user content further comprises:
providing a user information form in association with the multi-user content,
the user information form to be interacted with, via the one or more user devices, to access the multi-user content;
receiving user information based on an interaction with the user information form via the one or more user devices; and
storing the received user information.

18. The method of claim 17, further comprising:
causing the one or more user devices to provide the user information to an administrator device via a network other than the local area network and at a location other than the location.

19. The method of claim 15, where the multi-user content includes at least one of:
advertising content,
visual information,
textual information,
audible information,
an image,
a video,
a game,
a form, to be completed by a user and/or a user device, of the one or more user devices, or
an application.

20. The method of claim 15, further comprising:
causing the display to visually display media based on the multi-user content,
the media being received from the one or more user devices.

* * * * *